(12) United States Patent
Kitazawa et al.

(10) Patent No.: US 6,845,107 B1
(45) Date of Patent: Jan. 18, 2005

(54) VIDEO DATA MULTIPLEXER, VIDEO DATA MULTIPLEXING CONTROL METHOD, METHOD AND APPARATUS FOR MULTIPLEXING ENCODED STREAM, AND ENCODING METHOD AND APPARATUS

(75) Inventors: Toshihiko Kitazawa, Kanagawa (JP); Takao Suzuki, Kanagawa (JP); Hiroaki Seto, Kanagawa (JP); Yoichi Matsumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/319,851

(22) PCT Filed: Oct. 15, 1998

(86) PCT No.: PCT/JP98/04667

§ 371 (c)(1),
(2), (4) Date: Jun. 11, 1999

(87) PCT Pub. No.: WO99/20051

PCT Pub. Date: Apr. 22, 1999

(30) Foreign Application Priority Data

Oct. 15, 1997 (JP) ............................................. 9-282155

(51) Int. Cl.$^7$ ................................................. H04J 3/02

(52) U.S. Cl. ........................ 370/537; 370/534; 370/535; 370/538; 370/540; 370/545; 375/240.03; 375/240.12; 348/388.1; 348/387.1; 382/239; 382/234

(58) Field of Search ................................ 370/485, 486, 370/534, 535, 536, 537, 538, 539, 540, 541, 542, 543, 544, 545, 533, 532, 468, 477; 348/388.1, 387.1, 398.1, 423; 382/232, 234, 239; 375/240.11, 240.03, 240.12; 725/114, 139, 91, 95, 96

(56) References Cited

U.S. PATENT DOCUMENTS

| | | | | | |
|---|---|---|---|---|---|
| 5,115,309 | A | * | 5/1992 | Hang ...................... | 348/388.1 |
| 5,708,664 | A | * | 1/1998 | Budge et al. ............... | 370/538 |
| 5,956,426 | A | * | 9/1999 | Matsuura et al. ........... | 382/239 |
| 6,167,087 | A | * | 12/2000 | Kato ..................... | 375/240.03 |
| 6,243,417 | B1 | * | 6/2001 | Obikane et al. ....... | 375/240.03 |
| 6,278,735 | B1 | * | 8/2001 | Mohsenian ................ | 375/240 |
| 6,292,589 | B1 | * | 9/2001 | Chow et al. ................ | 382/239 |
| 6,408,095 | B1 | * | 6/2002 | Maeda et al. ............... | 382/232 |

(List continued on next page.)

FOREIGN PATENT DOCUMENTS

| | | |
|---|---|---|
| JP | 07264580 | 10/1995 |
| JP | 09252290 | 9/1997 |

*Primary Examiner*—Wellington Chin
*Assistant Examiner*—Chuong Ho
(74) *Attorney, Agent, or Firm*—Frommer Lawrence & Haug LLP; William S. Frommer; Bruno Polito

(57) ABSTRACT

The present invention makes it possible to efficiently transmit data for statistical multiplexing which is required for control using statistical multiplexing. By utilizing private packets, respective encoding devices transmit encoding difficulties serving as the data for statistical multiplexing to a multiplexer (4) via the same transmission channels as encoded video data and audio data are transmitted. The multiplexer (4) conducts multiplexing processing on data supplied from the respective encoding devices at a first rate R1 larger than a transmission rate on a transmission channel of a subsequent stage, and outputs a transport stream ($TS_d$ including the private packets to a statistical multiplexing computer. In addition, the multiplexer (4) conducts multiplexing processing on data obtained by removing the private packets, at a second rate R2 which is equal to the transmission rate on the transmission channel of the subsequent stage, and outputs a transport stream ($TS_m$) which does not include the private packets to the transmission channel of the subsequent stage.

5 Claims, 23 Drawing Sheets

U.S. PATENT DOCUMENTS 6,487,220 B2 * 11/2002 Matsuzaki et al. .......... 370/487
6,522,672 B1 * 2/2003 Matsuzaki et al. .......... 370/539
6,721,957 B1 * 4/2004 Lawrence ................... 725/114
6,754,241 B1 * 6/2004 Krishnamurthy et al. ... 370/537

* cited by examiner

VIDEO DATA MULTIPLEXER, VIDEO DATA MULTIPLEXING CONTROL METHOD, METHOD AND APPARATUS FOR MULTIPLEXING ENCODED STREAM, AND ENCODING METHOD AND APPARATUS

TECHNICAL FIELD

The present invention relates to a video data multiplexing device and a video data multiplexing control method for compressing and encoding a plurality of program data including video data and multiplexing them, an encoded stream multiplexing device and method for multiplexing encoded streams, and an encoding device and method for encoding video data.

BACKGROUND ART

Recently, digital broadcasting in which image data and so on are transmitted and received as digital data is drawing the attention. An advantage of the digital broadcasting is that more program data (hereinafter referred to as programs) can be transmitted over the same transmission channel as compared with analog broadcasting. This is due in large part to the fact that image data can be compressed before being transmitted. As the method for compressing image data, there is, for example, a bidirectional predictive encoding system adopted in MPEG (Moving picture Experts Group) standards. In this bidirectional predictive encoding system, three types of encoding, i.e., intra-frame encoding, inter-frame forward predictive encoding, and bidirectional predictive encoding are performed. Images obtained by using respective encoding types are called I picture (intra encoded picture), P picture (predictive encoded picture), and B picture (bidirectionally predictive encoded picture), respectively.

FIG. 1 is a block diagram showing an example of a configuration of a digital broadcasting system using an image encoding device of the bidirectional predictive encoding system according to the MPEG standards. A digital broadcasting system 300 includes a plurality of image encoding devices $301_1$ through $301_n$ (where n is an integer value of minimum 2) for compressing and encoding program data such as image data, a multiplexer 302 connected to these image encoding devices $301_1$ through $301_n$ so as to multiplex data compressed and encoded by the respective image encoding devices $301_1$ through $301_n$, and a modulator 303 for modulating output image data multiplexed by the multiplexer 302. In the digital broadcasting system 300, image data are compressed and encoded by n image encoding devices $301_1$ through $301_n$, and outputted to the multiplexer 302. The multiplexer 302 multiplexes compressed and encoded data inputted from the image encoding devices $301_1$ through $301_n$, and outputs the multiplexed data to the modulator 303 with a fixed data rate (speed) of, for example, approximately 30 Mbps. The compressed and encoded data supplied from the multiplexer 302 is modulated by the modulator 303, and transmitted to each home 305 via a broadcasting satellite 304.

FIG. 2 is a block diagram showing an example of a configuration of the image encoding device illustrated in FIG. 1. The image encoding device 301 (which is representative of $301_1$ through $301_n$) includes: a subtraction circuit 310 for deriving a difference between inputted image data $S_{101}$ and predicted image data; a DCT circuit 311 for conducting DCT on output data of the subtraction circuit 310 by each DCT block and outputting a DCT coefficient; a quantization circuit 312 for quantizing output data of the DCT circuit 311; a variable length encoding circuit 313 for conducting variable length encoding on output data of the quantization circuit 312; a buffer memory 314 for temporarily holding output data of the variable length encoding circuit 313 and outputting it as compressed image data $S_{102}$ comprising a bit stream having a fixed bit rate; an inverse quantization circuit 315 for conducting inverse quantization on the output data of the quantization circuit 312; an inverse DCT circuit 316 for conducting inverse DCT on output data of the inverse qunatization circuit 315; an addition circuit 317 for adding output data of the inverse DCT circuit 316 to the predicted image data and outputting a resulting sum; a motion compensation circuit 318 for holding the output data of the addition circuit 317, conducting motion compensation on the output data on the basis of a motion vector, and outputting predicted image data to the subtraction circuit 310 and the addition circuit 317; a bit rate control unit 319 for controlling a target code quantity on the basis of generated bit quantity data $S_{103}$ supplied from the variable length encoding circuit 313 so as to make the compressed image data $S_{102}$ outputted from the buffer memory 314 become a bit stream having a fixed rate; and a motion detection circuit 309 for detecting the motion vector on the basis of the inputted image data $S_{101}$ and transmitting the detected motion vector to the motion compensation circuit 318.

In the image encoding device 301 shown in FIG. 2, the image data $S_{101}$ is inputted to the subtraction circuit 310. The output signal of the subtraction circuit 310 is inputted to the DCT circuit 311, and subjected to DCT. The output signal of the DCT circuit 311 is quantized by the quantization circuit 312, and subjected to variable length encoding in the variable length encoding circuit 313. The output data of the variable length encoding circuit 313 is temporarily held by the buffer memory 314 and outputted as the compressed image data $S_{102}$.

Furthermore, from the variable length encoding circuit 313, the generated bit quantity data $S_{103}$ is outputted to the bit rate control unit 319. On the basis of the generated bit quantity data $S_{103}$, the bit rate control unit 319 determines the target code quantity. According to the target code quantity, the bit rate control unit 319 controls quantization characteristic in the quantization circuit 312.

By the way, in image compression and encoding in digital broadcasting, it is necessary to keep the image quality high while suppressing the data quantity being compressed and encoded to be the transmission capacity of a transmission channel or less.

There is a technique called "statistical multiplexing", as a method for letting more programs flow through a transmission channel having a predetermined transmission capacity. The statistical multiplexing is a technique for transmitting a larger number of programs by dynamically changing transmission rates of respective programs. According to this statistical multiplexing, for example, the transmission rates are lowered on programs which transmission rates reduction do not cause a conspicuous image quality degradation, so as to make it possible to transmit a larger number of programs. The statistical multiplexing utilizes the fact that such portions (time periods) of respective programs in which image quality degradation are conspicuous, rarely overlap with one another simultaneously. Therefore, when such a portion of a certain program which makes conspicuous image quality degradation is transmitted, image quality degradation is not conspicuous in other programs in many cases even if the code rate is lowered. Accordingly, it is possible to lower code rates of other programs and assign the higher code rate to such a program that image quality degradation is conspicuous. By using the statistical multiplexing, a larger number of programs than the ordinary case can thus be transmitted.

In such a statistical multiplexing, a bit rate assigning technique for determining a bit rate quantity as code rates to be assigned to respective programs is an important factor in determining the image quality and so on. According to a representative technique proposed heretofore as a bit rate assigning technique, quantization steps used in respective programs are monitored and they are subjected to feedback control so that the quantization steps will become the same in all programs or quantization steps will have weights preset for respective programs. In such a feedback control, after an image is encoded, the next bit rate is determined on the basis of a quantization step used at the time of encoding the image. Therefore, when the pattern is abruptly changed to a difficult pattern caused by such as scene change, a countermeasure will be delayed, resulting in a problem that image distortion occurs significantly.

On the other hand, in order to solve the problem of such a countermeasure delay of the control system due to feedback control, the present applicant has proposed a technique called feedforward control, in which, encoding difficulty representing the difficulty of the encoding regarding an image to be encoded, is derived beforehand, and bit rates of respective programs are determined according to this encoding difficulty. This feedforward control technique is implemented basically by distributing a total bit rate after being multiplexed among respective programs according to ratios of encoding difficulty data read from the respective programs beforehand. Allocation of bit rates to respective programs according to ratios of the encoding difficulty data is determined by proportional allocation as represented by the following expression (1).

$$R_i = (D_i / \Sigma D_k) \times Total\_Rate \quad (1)$$

In the expression (1), $R_i$ means a bit rate of a program number i, $D_i$ encoding difficulty of the program per unit time, Total_Rate a total bit rate, and $\Sigma$ a sum total over k=1 to L (where L is the total number of programs).

Alternatively, allocation of bit rates to respective programs is determined as represented by the following expression (2) by adding weight coefficients $W_i$ to respective programs.

$$R_i = \{W_i \times D_i / \Sigma (W_k \times D_k)\} Total\_Rate \quad (2)$$

In this way, the bit rates are proportionally allocated according to the encoding difficulty values.

FIG. 3 is a block diagram showing an example of a configuration of a multiplexing device using the above described statistical multiplexing. This multiplexing device 330 includes a plural of image encoding devices $331_1$ $331_n$ for conducting compression encoding on respective inputted programs $P_1$ to $P_n$, a statistical multiplexing controller 332 connected to n image encoding devices $331_1$ to $331_n$ to control the image encoding devices 331, to $331_n$, and a multiplexer 333 for multiplexing compressed and encoded data $St_1$ to $St_n$ compressed and encoded by the image encoding devices $331_1$ to $331_n$. The image encoding devices $331_1$ to $331_n$ in advance derive encoding difficulties $D_1$ to $D_n$ each of which represents the difficulty of encoding with regard to an image to be encoded, and output the encoding difficulties $D_1$ to $D_n$ to the statistical multiplexing controller 332. By distributing the total bit rate after being multiplexed according to the ratios of these encoding difficulties $D_1$ to $D_n$, the statistical multiplexing controller 332 determines target bit rates for the respective programs $P_1$ to $P_n$ according to the ratios of the encoding difficulties $D_1$ to $D_n$ and outputs control data $CR_1$ to $CR_n$ such as the target bit rates to the image encoding devices $331_1$ to $331_n$, respectively. On the basis of the control data $CR_1$ to $CR_n$ such as the target bit rates supplied from the statistical multiplexing controller 332, each of the image encoding devices $331_1$ to $331_n$ conducts compression encoding on the programs $P_1$ to $P_n$, and outputs compressed and encoded data $St_1$ to $St_n$ to the multiplexer 333. The multiplexer 333 multiplexes the respective compressed and encoded data $St_1$ to $St_n$ which were inputted, generating image data Sm to be outputted, and outputs the image data Sm to the modulator 303 shown in FIG. 1.

FIG. 4 is a block diagram showing an example of a configuration of the image encoding devices illustrated in FIG. 3. In this image encoding device 331 (which is representative of $331_1$ to $331_n$), the same components as those of the image encoding device 301 are denoted by same marks, and description thereof will be omitted. In this image encoding device 331, the statistical multiplexing controller 332 controls the target code quantity, instead of the bit rate control unit 319 of the image encoding device 301 shown in FIG. 2. The motion detection circuit 309 in this image encoding device 331 outputs a ME residual to the statistical multiplexing controller 332 as encoding difficulties D while deriving a motion vector. In brief, the ME residual is the sum total of absolute values or the sum total of squared values of motion prediction errors over a whole picture. On the basis of the encoding difficulties D supplied from the motion detection circuits 309 of each of the image encoding devices 331, the statistical multiplexing controller 332 conducts control using statistical multiplexing, generates control data CR such as target code quantities, and outputs the control data CR to quantization circuits 342. On the basis of the control data CR, the quantization circuit 342 quantizes data outputted from the DCT circuit 311, and outputs the quantized data to a variable length encoding circuit 343. By the way, the statistical multiplexing controller 332 is supplied with the encoding difficulties D from each of the image encoding devices 331, and outputs the control data CR to the quantization circuits 342 each of the image encoding devices 331. In FIG. 4, D is representative of $D_1$ to $D_n$, and CR is representative of $CR_1$ to $CR_n$.

Each of FIGS. 5A to 5C shows an example of a bit rate change in each of the image encoding devices included in the multiplexing device using the statistical multiplexing. FIG. 5A shows a bit rate change in the image encoding device $331_1$. FIG. 5B shows a bit rate change in the image encoding device $331_2$. FIG. 6C shows a bit rate change in the image encoding device $331_n$. The axis of ordinates represents the bit rate of the image encoding device, and the axis of abscissas represents time. As described above, the statistical multiplexing utilizes the fact that such portions (time periods) of respective programs in which image quality degradation is conspicuous rarely overlap with one another simultaneously. Therefore, when such a portion of a certain program in which image quality degradation is conspicuous is transmitted, image quality degradation is not conspicuous in other programs even if the bit rate is lowered. Accordingly, it is possible to assign some of bit rates of the other programs to such a program that image quality degradation is conspicuous.

As shown in FIGS. 5A to 5C, bit rates assigned to respective image encoding devices $331_1$ to $331_n$ in which respective programs are inputted are controlled so as to become variable rates in the time axis direction. As shown in FIG. 5A, for example, the bit rate of the image encoding device $331_1$ is high at, time A. This is because in the image encoding device $331_1$, the value of the encoding difficulty becomes high at the time A as the image motion is rapid or the pattern is complicated then. Therefore, a high bit rate is assigned to the image encoding device $331_1$ at the time A. On the other hand, in the image encoding device $331_n$ at time B, the encoding difficulty value becomes low as shown in FIG. 5C, because the image is nearly still or the pattern is simple. Therefore, a low bit rate is assigned to the image encoding device $331_n$ at the time B. Furthermore, the sum total of the bit rates assigned to respective image encoding devices $331_1$ to $331_n$ must be fixed. For example, at time C of FIGS. 5A to 5C, the sum total of bit rates R1 to Rn respectively assigned to each image encoding devices $331_1$ to $331_n$ is a fixed quantity, and this becomes the bit rate of the modulator 303 shown in FIG. 1. By using the statistical multiplexing, a larger number of programs than the ordinary case can thus be transmitted.

However, in the multiplexing device 330 shown in FIG. 4, the encoding difficulties $D_1$ to $D_n$ are sent from the respective image encoding devices $331_1$ to $331_n$ to the statistical multiplexing controller 332. The control data $CR_1$ to $CR_n$ such as target bit rates derived from the statistical multiplexing controller 332 on the basis of those encoding difficulties $D_1$ to $D_n$ are sent to the image encoding devices $331_1$ to $331_n$ respectively. Therefore, in the statistical multiplexing controller, an input portion and an output portion corresponding to the image encoding devices $331_1$ to $331_n$ become necessary, resulting in the enlargement of the scale and a problem that data exchange with respective image encoding devices become complicated.

Furthermore, as a multiplexing device using statistical multiplexing, the present applicant previously has proposed a multiplexing device (Japanese Patent Application No. 9-179882), wherein the statistical multiplexing computer conducting bit rate control of feedforward type using a computer for general purpose instead of a statistical multiplexing controller serving as a dedicated device is connected to respective image encoding devices via a network such as Ethernet, and exchange of the encoding difficulties between respective image encoding devices and the statistical multiplexing computer is conducted via the Ethernet. FIG. 6 is a block diagram showing an example of a configuration using the statistical multiplexing computer. In this statistical multiplexing system 400, respective image encoding devices $402_1$ to $402n$ output transport streams $St_1$ to $St_n$, each containing an encoded data sequence corresponding to one channel, to a multiplexer 404. The image encoding devices $402_1$ to $402n$ output encoding difficulties $D_1$ to $D_n$ respectively, for controlling compression encoding in the image encoding devices $402_1$ to $402n$, to the statistical multiplexing computer 403. By taking a packet as a unit, the encoding difficulties $D_1$ to $D_n$ are sent from the image encoding devices $402_1$ to $402n$ to the statistical multiplexing computer 403 via an Ethernet 405, respectively. Target bit rates $Rate_1$ to $Rate_n$ respectively assigned to the encoding difficulties $D_1$ to $D_n$ are returned to the respective image encoding devices $402_1$ to $402n$ via the same Ethernet 405.

According to the statistical multiplexing system shown in FIG. 6, it thus becomes possible to transmit the encoding difficulties $D_1$ to $D_n$ and the target bit rates $Rate_1$ to $Rate_n$ efficiently between the image encoding devices $402_1$ to $402_n$ and the statistical multiplexing computer 403.

However, in the statistical multiplexing system shown in FIG. 6, the network serving as transmission channels between the image encoding devices $402_1$ to $402_n$ and the statistical multiplexing computer 403, such as the Ethernet 405, goes down in efficiency when the number of transmitted packets increases. Thus there is a possibility that a trouble may occur in the statistical multiplexing system 400 for controlling a large number of image encoding devices $402_1$ to $402_n$ connected to the network.

Furthermore, the Ethernet 405 is usually used for control systems other than the statistical multiplexing system as well. When a command is sent for the control, there is a possibility that the transmitting of the encoding difficulties $D_1$ to $D_n$ and the target bit rates $Rate_1$ to $Rate_n$ are affected.

DISCLOSURE OF INVENTION

In view of such problems, the present invention has been performed. An object of the present invention is to provide a video data multiplexing device, a video data multiplexing control method, an encoded stream multiplexing device, and method, and an encoding device, and method, which make it possible to efficiently transmit data for statistical multiplexing required for control using statistical multiplexing.

A video data multiplexing device of the present invention comprises: a plurality of encoding means for encoding program data respectively including video data, outputting resultant encoded streams, while generating statistical multiplexing data required for control using statistical multiplexing, and outputting the generated data on the same transmission channels as the encoded streams; multiplexing means for acquiring the encoded streams and the statistical multiplexing data from the respective encoding means via the transmission channels, and multiplexing and outputting them; and encoding control means for acquiring the statistical multiplexing data of respective encoding means from the output of the multiplexing means, and conducting control using statistical multiplexing on respective encoding means on the basis of the statistical multiplexing data.

In the video data multiplexing device of the present invention, by the respective encoding means, each of program data is encoded, statistical multiplexing data required for control using statistical multiplexing, are generated, and the data are outputted to the same transmission channels as the encoded streams are transmitted. Also, by the multiplexing means, the encoded streams and the statistical multiplexing data from the respective encoding means are acquired via the transmission channels, and they are multiplexed and outputted. Furthermore, by the encoding control means, the statistical multiplexing data of respective encoding means from the output of the multiplexing means are acquired, and control using statistical multiplexing on respective encoding means in conducted on the basis of the statistical multiplexing data.

A video data multiplexing control method of the present invention for effecting control on the respective encoding means by the encoding control means, used in a video data multiplexing device including a plurality of encoding means for encoding program data respectively including video data and outputting encoded streams, multiplexing means for multiplexing the encoded streams outputted from the respective encoding means, and encoding control means for controlling the respective encoding means, comprises: a statistical multiplexing data output procedure in the encoding means, generating statistical multiplexing data required for control using statistical multiplexing and outputting the generated data to the same transmission channels as the encoded streams are transmitted; a multiplexing procedure in the multiplexing means, acquiring the encoded streams and the statistical multiplexing data from the respective encoding means via the transmission channels, and multiplexing and outputting them; and an encoding control procedure in the encoding control means for acquiring the statistical multiplexing data of the respective encoding means from output of the multiplexing means, and conducting control using statistical multiplexing on the respective encoding means on the basis of the statistical multiplexing data.

In the video data multiplexing control method of the present invention, statistical multiplexing data required for control using statistical multiplexing is generated and outputted on the same transmission channels as the encoded streams are transmitted by the statistical multiplexing data output procedure in the encoding means. The encoded streams and the statistical multiplexing data are acquired from the respective encoding means via the transmission channels, and multiplexed and outputted by the multiplexing procedure in the multiplexing means. The statistical multiplexing data of the respective encoding means is acquired from output of the multiplexing means, and control using statistical multiplexing is conducted on the respective encoding means on the basis of the statistical multiplexing data, by the encoding control procedure in the encoding control means.

Another video data multiplexing device of the present invention comprises: a plurality of encoding means for encoding program data respectively including video data, outputting a resultant encoded streams, while generating statistical multiplexing data required for control using statistical multiplexing, and outputting the generated data on the same transmission channel as the encoded streams are transmitted; multiplexing means for acquiring the encoded streams and the statistical multiplexing data from the respective encoding means via the transmission channels, conducting multiplexing processing on the encoded streams and the statistical multiplexing data at a first rate greater than a data transmission rate on a transmission channel of a subsequent stage, outputting first data including the statistical multiplexing data, while conducting multiplexing processing on data, obtained by removing the statistical multiplexing data from the data outputted from the respective encoding means, at a second rate equal to a data transmission rate on the transmission channel of the subsequent stage, and outputting second data, which does not include the statistical multiplexing data, to the transmission channel of the subsequent stage; and encoding control means for acquiring the statistical multiplexing data of the respective encoding means from the first data outputted from the multiplexing means, and conducting control using statistical multiplexing on the respective encoding means on the basis of the statistical multiplexing data.

In another video data multiplexing device of the present invention, the respective encoding means code respective program data and output resultant encoded streams. In addition, the respective encoding means generate statistical multiplexing data required for control using statistical multiplexing, and output the generated data on the same transmission channels as the encoded streams are transmitted. Furthermore, the multiplexing means acquires the encoded stream and the statistical multiplexing data from the respective encoding means via the transmission channels, conducts multiplexing processing on the encoded streams and the statistical multiplexing data at a first rate greater than a data transmission rate on a transmission channel of a subsequent stage, and outputs first data including the statistical multiplexing data. In addition, the multiplexing means conducts multiplexing processing on data, obtained by removing the statistical multiplexing data from the data outputted from the respective encoding means, at a second rate equal to a data transmission rate on the transmission channel of the subsequent stage, and outputs second data which does not include the statistical multiplexing data to the transmission channel of the subsequent stage. The encoding control means acquires the statistical multiplexing data of the respective encoding means from the first data outputted from the multiplexing means, and conducts control using statistical multiplexing on the respective encoding means on the basis of the statistical multiplexing data.

In a video data multiplexing control method which is used in a video multiplexing device including a plurality of encoding means for encoding program data respectively including video data and outputting encoded streams, multiplexing means for multiplexing the encoded streams outputted from the respective encoding means, and encoding control means for controlling the respective encoding means, wherein control using statistical multiplexing is conducted on the respective encoding means by encoding control means, comprises: a statistical multiplexing data output procedure in the encoding means for generating statistical multiplexing data required for control using statistical multiplexing, and outputting the generated data on the same transmission channels as encoded streams are transmitted; a multiplexing procedure in the multiplexing means for acquiring the encoded streams and the statistical multiplexing data from the respective encoding means via the transmission channels, conducting multiplexing processing on the encoded streams and the statistical multiplexing data at a first rate greater than a data transmission rate on a transmission channel of a subsequent stage, outputting first data including the statistical multiplexing data, conducting multiplexing processing on data obtained by removing the statistical multiplexing data from the data outputted from the respective encoding means, at a second rate equal to a data transmission rate on the transmission channel of the subsequent stage, and outputting second data which does not include the statistical multiplexing data to the transmission channel of the subsequent stage; and an encoding control procedure in the encoding control means for acquiring the statistical multiplexing data of the respective encoding means from the first data outputted from the multiplexing means, and conducting control using statistical multiplexing on the respective encoding means on the basis of the statistical multiplexing data.

In another video data multiplexing control method of the present invention, statistical multiplexing data required for control using statistical multiplexing is generated and outputted on the same transmission channels as the encoded streams, by the statistical multiplexing data output procedure in the encoding means. Furthermore, by the multiplexing procedure in the multiplexing means, the encoded streams and the statistical multiplexing data are acquired from the respective encoding means via the transmission channels, subjected to multiplexing processing at a first rate greater than a data transmission rate on a transmission channel of a subsequent stage, and first data including the statistical multiplexing data is outputted. In addition, data obtained by removing the statistical multiplexing data from the data outputted from the respective encoding means are subjected to multiplexing processing at a second rate equal to a data transmission rate on the transmission channel of the subsequent stage, and second data which does not include the statistical multiplexing data is outputted to the transmission channel of the subsequent stage. Furthermore, by the encoding control procedure in the encoding control means, the statistical multiplexing data of the respective encoding means is acquired from the first data outputted from the multiplexing means, and control using statistical multiplexing is conducted on the respective encoding means on the basis of the statistical multiplexing data.

An encoded stream multiplexing device for multiplexing encoded streams according to the present invention comprises: a plurality of encoding means for respectively encoding video data of a plurality of channels on the basis of target encoding rates and outputting encoded video streams; encoding control means for computing the target encoding rates supplied to the plurality of encoding means for respective channels; and multiplexing means for multiplexing a plurality of encoded streams respectively outputted from the plurality of encoding means. The plurality of encoding means output the encoded video streams as video transport stream packets, and output encoding difficulty information indicating encoding difficulties in encoding video data of the plurality of channels as private transport stream packets. The multiplexing means includes a multiplexing circuit for receiving a plurality of transport streams including the video transport stream packets and the private transport stream packets respectively from the plurality of encoding means, multiplexing the plurality of transport streams, and thereby generating a multiplexed transport stream. The encoding control means receives the multiplexed transport stream from the multiplexing means, extracts the private transport stream packet included in the multiplexed transport stream, and computes the target encoding rates respectively corresponding to the plurality of channels on the basis of the encoding difficulty information described in the extracted private transport stream packets.

Another encoded stream multiplexing device for multiplexing encoded streams according to the present invention comprises: a plurality of encoding means for respectively encoding video data of a plurality of channels on the basis of target encoding rates, thereby generating encoded video streams, and outputting the encoded video streams as video transport stream packets, outputting encoding difficulty information indicating encoding difficulties in encoding video data of the plurality of channels as private transport stream packets; multiplexing means for receiving a plurality of transport streams including the video transport stream packets and the private transport stream packets respectively from the plurality of encoding means, multiplexing the plurality of transport streams, and thereby generating a multiplexed transport stream; and encoding control means for receiving the multiplexed transport stream from the multiplexing means, extracting the private transport stream packet included in the multiplexed transport stream, computing the target encoding rates respectively corresponding to the plurality of channels on the basis of the encoding difficulty information described in the extracted private transport stream packets, supplying the computed target encoding rates respectively to the plurality of encoding means, and thereby controlling rates of the encoded streams outputted from the plurality of encoding means.

An encoded stream multiplexing method for multiplexing a plurality of encoded streams generated by encoding video data of a plurality of channels according to the present invention comprises the steps of: encoding video data of the plurality of channels, generating a plurality of encoded streams, and calculating encoding difficulty information indicating encoding difficulties in encoding video data of the plurality of channels; outputting the plurality of encoded streams as video transport stream packets, and outputting the encoding difficulty information as private transport stream packets; respectively receiving a plurality of transport streams including the video transport stream packets and the private transport stream packets, multiplexing the plurality of transport streams, and thereby generating a multiplexed transport stream; and receiving the multiplexed transport stream, extracting the private transport stream packets included in the multiplexed transport stream, and computing the target encoding rates respectively corresponding to the plurality of channels on the basis of the encoding difficulty information described in the extracted private transport stream packets.

Another encoded stream multiplexing method for multiplexing a plurality of encoded streams according to the present invention comprises: a plurality of encoding steps for respectively encoding video data of a plurality of channels on the basis of target encoding rates, thereby generating encoded video streams, outputting the encoded video streams as video transport stream packets, and outputting encoding difficulty information indicating encoding difficulties in encoding video data of the plurality of channels as private transport stream packets; a multiplexing step for receiving a plurality of transport streams including the video transport stream packets and the private transport stream packets respectively from the plurality of encoding steps, multiplexing the plurality of transport streams, and thereby generating a multiplexed transport stream; and an encoding control step for receiving the multiplexed transport stream from the multiplexing step, extracting the private transport stream packets included in the multiplexed transport stream, computing the target encoding rates respectively corresponding to the plurality of channels on the basis of the encoding difficulty information described in the extracted private transport stream packets, supplying the computed target encoding rates respectively to the plurality of encoding steps, and thereby controlling rates of the encoded streams outputted from the plurality of encoding steps.

In the encoded stream multiplexing device or the encoded stream multiplexing method according to the present invention, a plurality of transport streams including the video transport stream packets and the private transport stream packets, which include the encoding difficulty information indicating the encoding difficulties at the time of encoding video data of the plurality of channels, are multiplexed. A multiplexed transport stream is thus generated. A private transport stream packets included in the multiplexed transport stream are extracted. On the basis of the encoding difficulty information described in the extracted private transport stream packets, the target encoding rates respectively corresponding to the plurality of channels are computed.

An encoding device for encoding video data of a plurality of channels according to the present invention comprises: a plurality of encoding means for respectively outputting a plurality of encoded video streams generated by encoding the video data of the plurality of channels as video transport stream packets, and outputting encoding difficulty information indicating encoding difficulties in encoding video data of the plurality of channels as private transport stream packets; and encoding control means for computing target encoding rates respectively corresponding to the plurality of channels on the basis of the encoding difficulty information described in the private transport stream packets outputted from the plurality of encoding means, supplying the computed target encoding rates respectively to the plurality of encoding means, and thereby controlling rates of the encoded streams outputted from the plurality of encoding means.

An encoding method for encoding video data of a plurality of channels according to the present invention comprises: outputting a plurality of encoded video streams generated by encoding the video data of the plurality of channels by using a plurality of encoding means as video transport stream packets, and outputting encoding difficulty information indicating encoding difficulties in encoding video data of the plurality of channels as private transport stream packets; and computing the target encoding rates respectively corresponding to the plurality of channels on the basis of the encoding difficulty information described in the outputted private transport stream packets, supplying the computed target encoding rates respectively to the plurality of encoding means, and thereby controlling rates of the encoded streams outputted from the plurality of encoding means.

In the encoding device or the encoding method according to the present invention, a plurality of encoded video streams generated by encoding the video data of the plurality of channels are outputted as video transport stream packets. In addition, encoding difficulty information indicating encoding difficulties in encoding video data of the plurality of channels is outputted as private transport stream packets. On the basis of the encoding difficulty information described in the outputted private transport stream packets, the target encoding rates respectively corresponding to the plurality of channels are computed, and thereby rates of the encoded streams are controlled.

Other objects, features, and advantages of the present invention will become apparent by the following description.

BEST MODE FOR CARRYING OUT THE INVENTION

Figure 1:
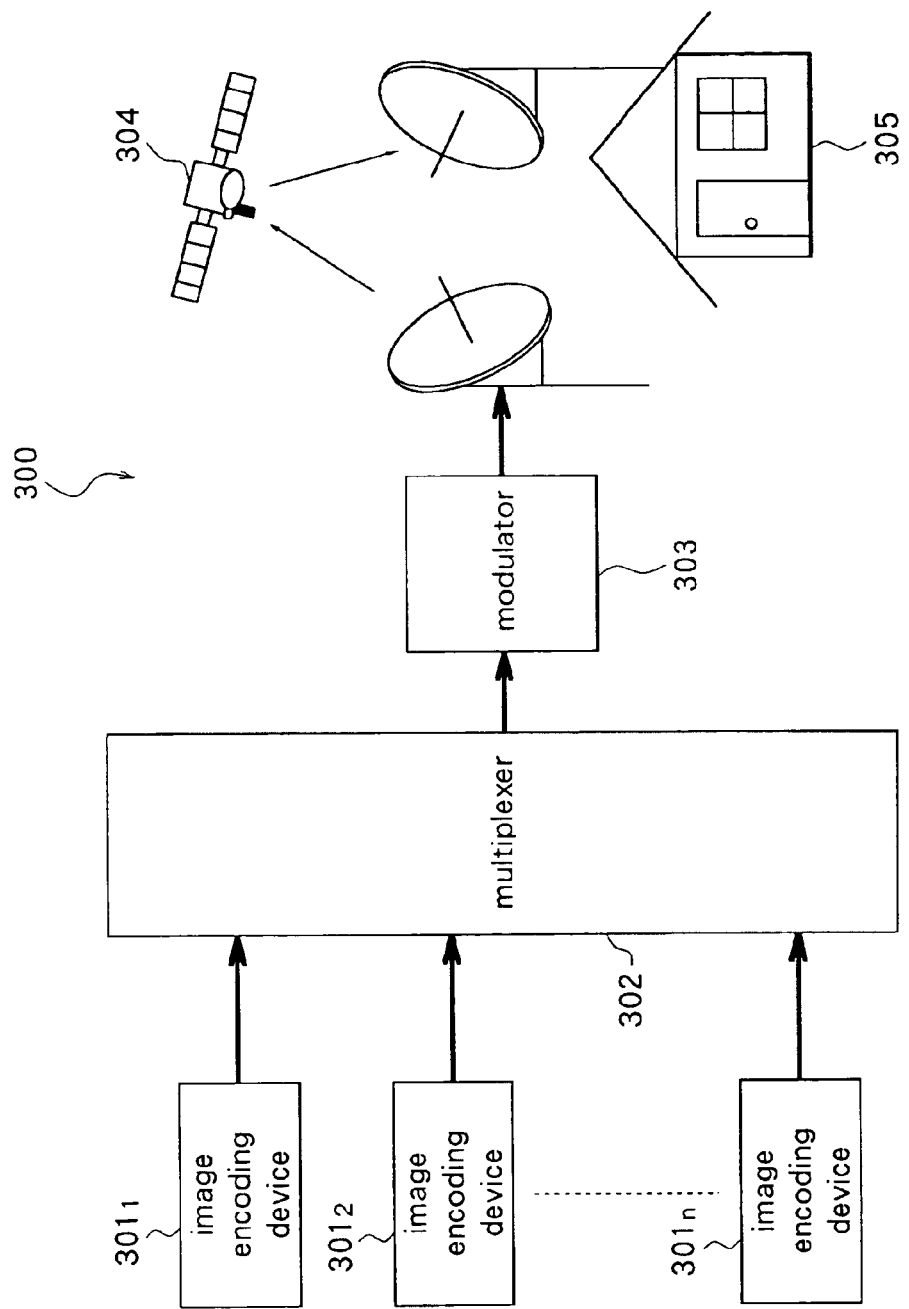
FIG. 1 is a block diagram showing a schematic configuration of a digital broadcasting system of a related art.
Figure 2:
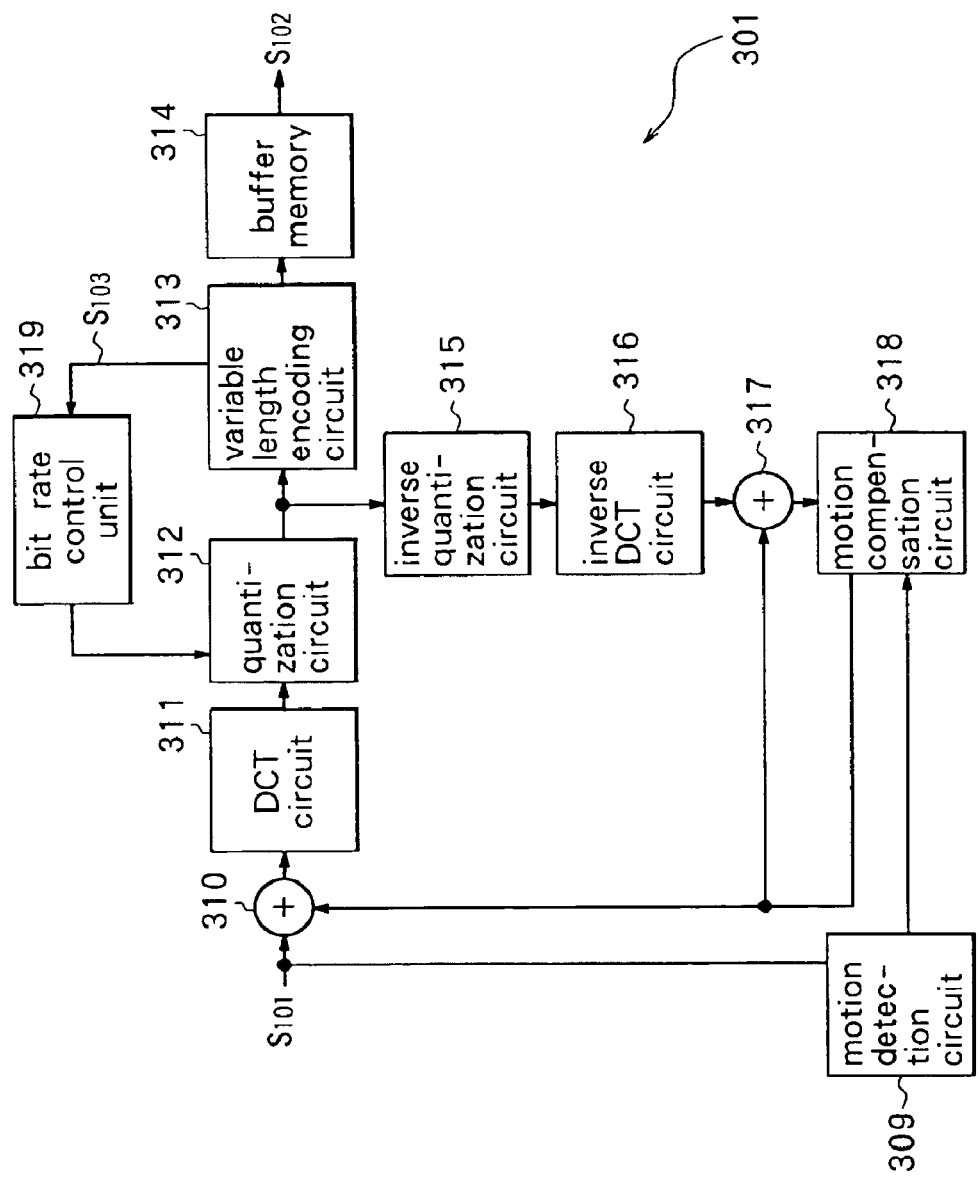
FIG. 2 is a block diagram showing a schematic configuration of an image encoding device illustrated in FIG. 1.
Figure 3:
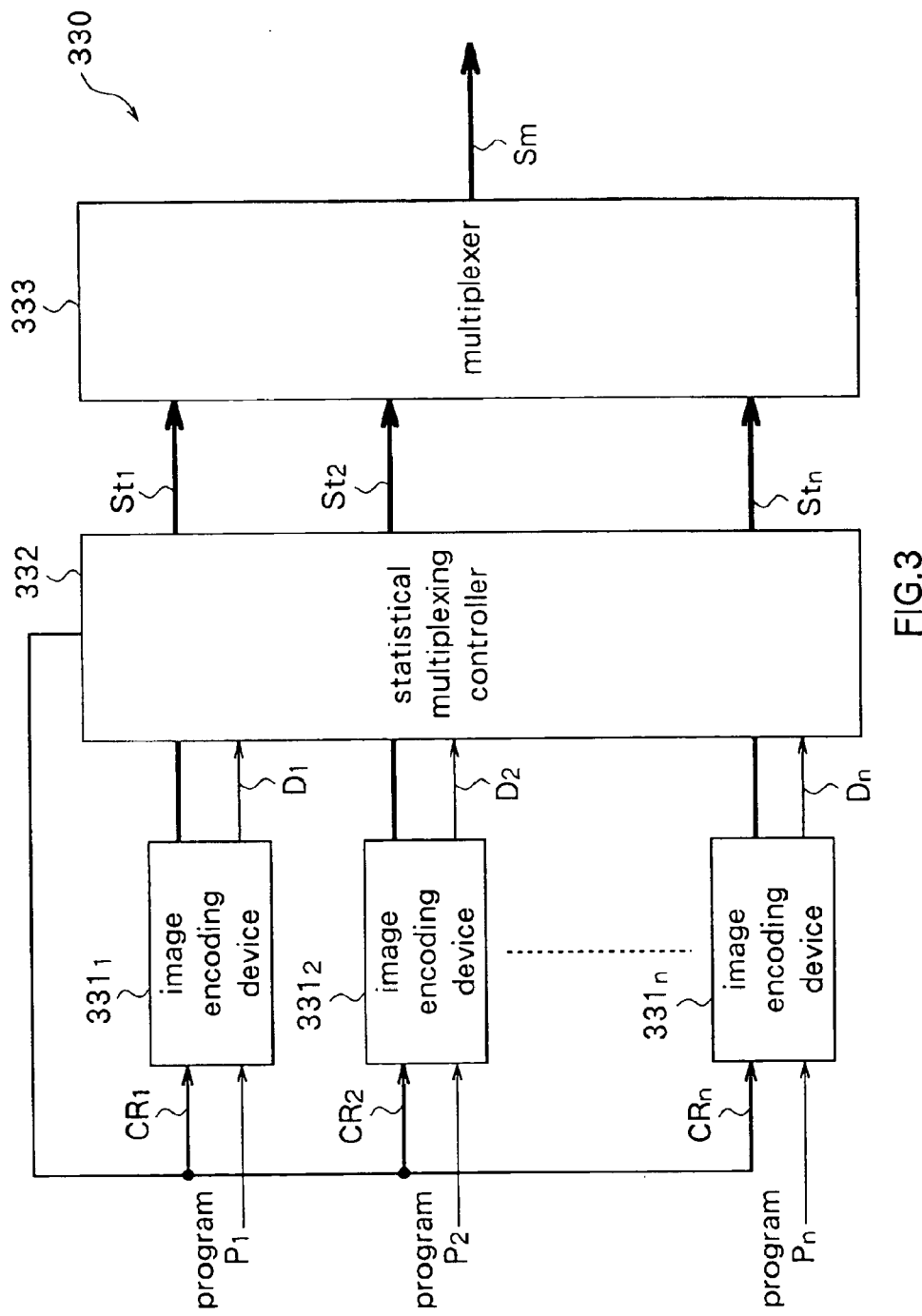
FIG. 3 is a block diagram showing a schematic configuration of a multiplexing device using statistical multiplexing of a related art.
Figure 4:
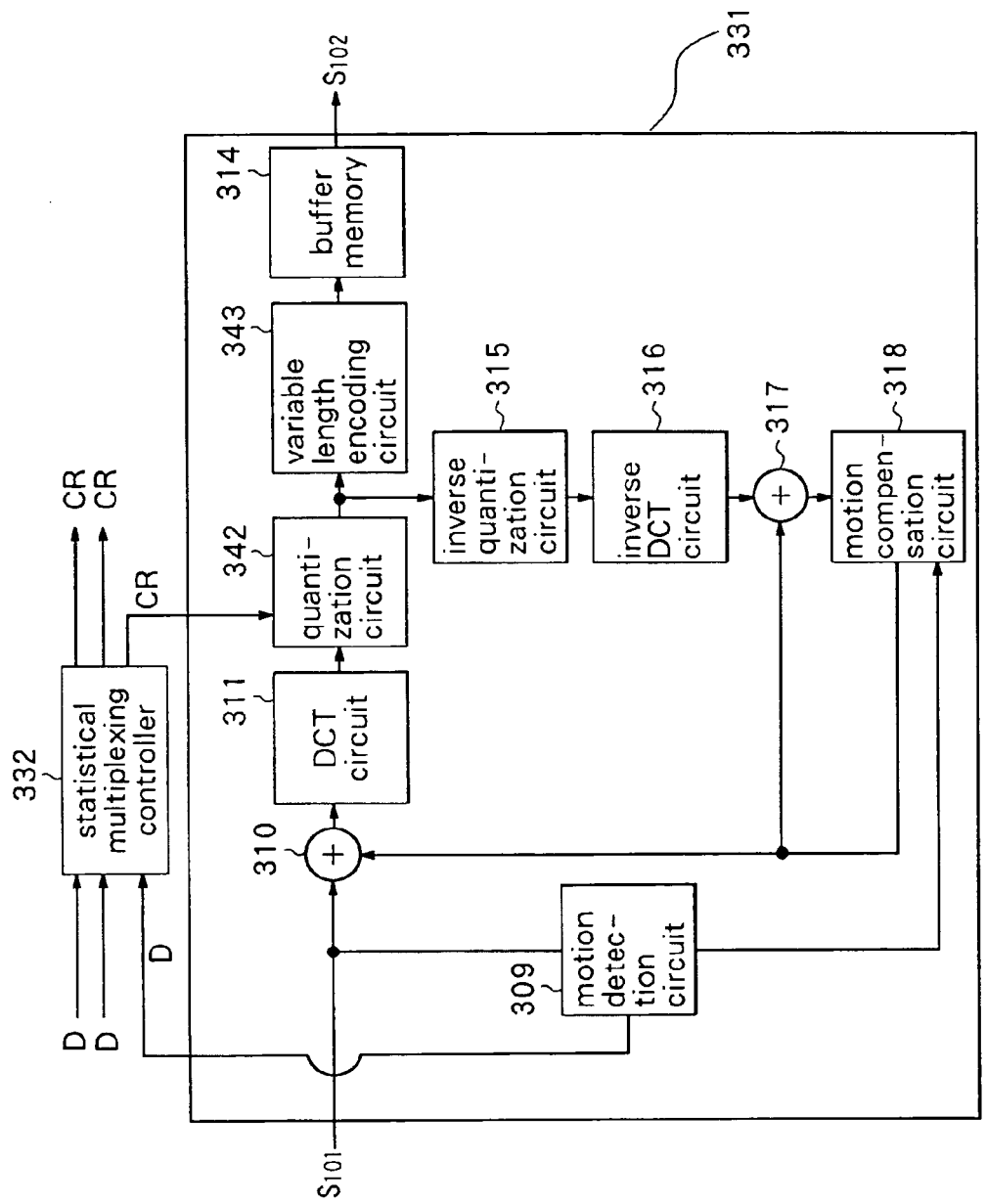
FIG. 4 is a block diagram showing a schematic configuration of an image encoding device illustrated in FIG. 3.
Figures 5A, 5B, 5C:
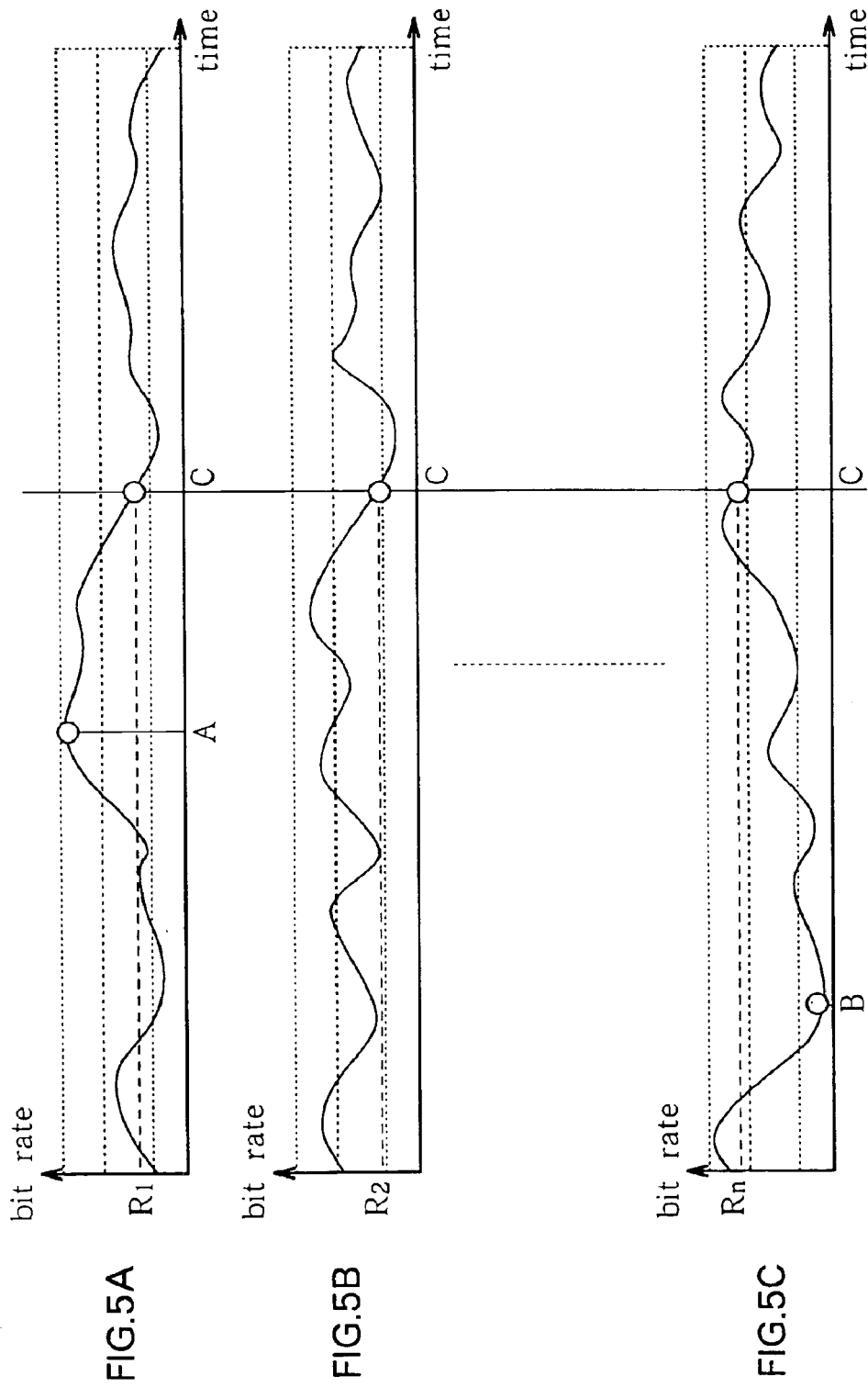
FIGS. 5A, 5B and 5C are diagrams illustrating bit rate changes in respective image encoding devices of FIG.
Figure 6:
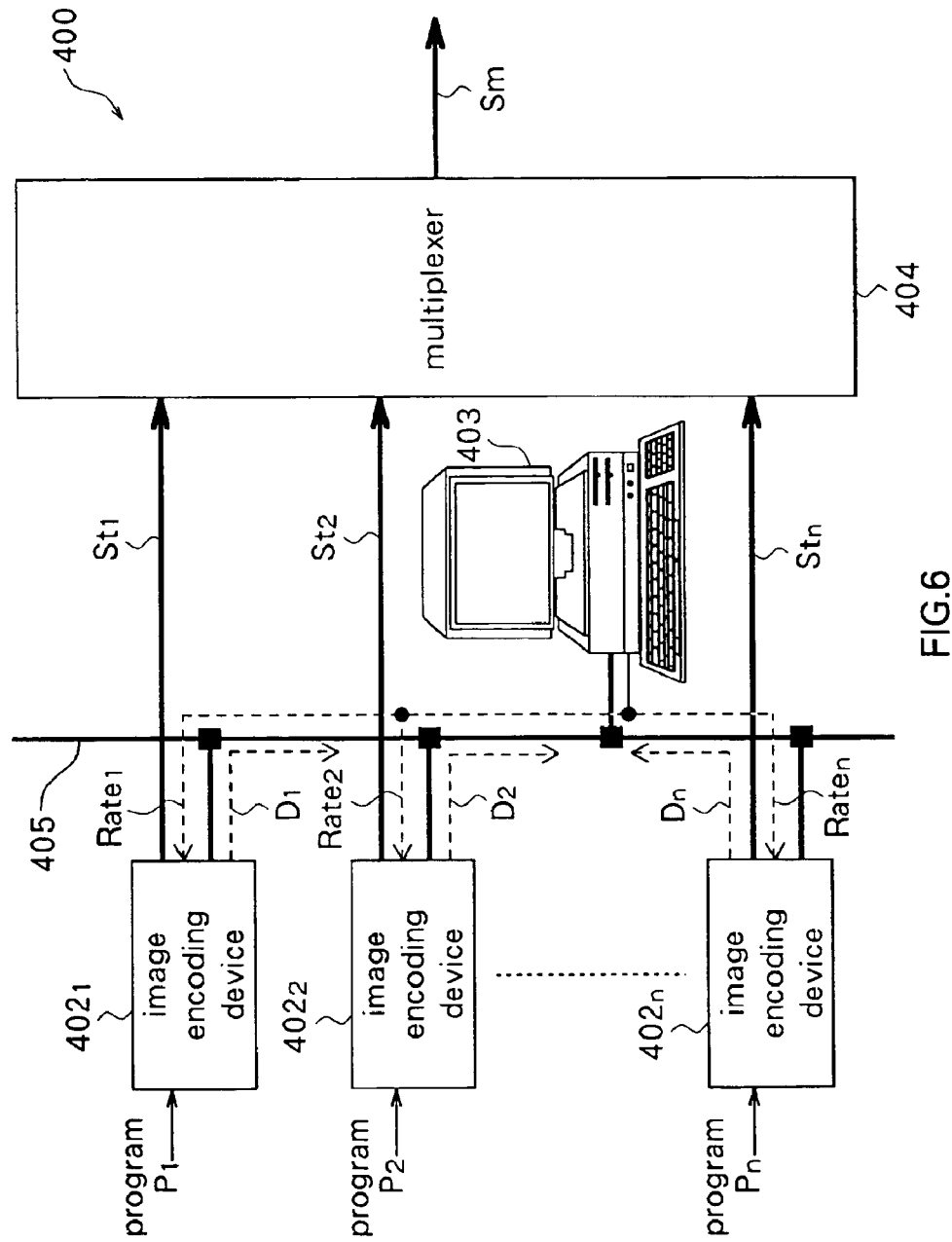
FIG. 6 is a block diagram showing a schematic configuration of a multiplexing device using a general purpose computer instead of a statistical multiplexing controller illustrated in FIG. 3.

Hereinafter, embodiments of the present invention will be described in detail by referring to the drawings.

Figure 7:
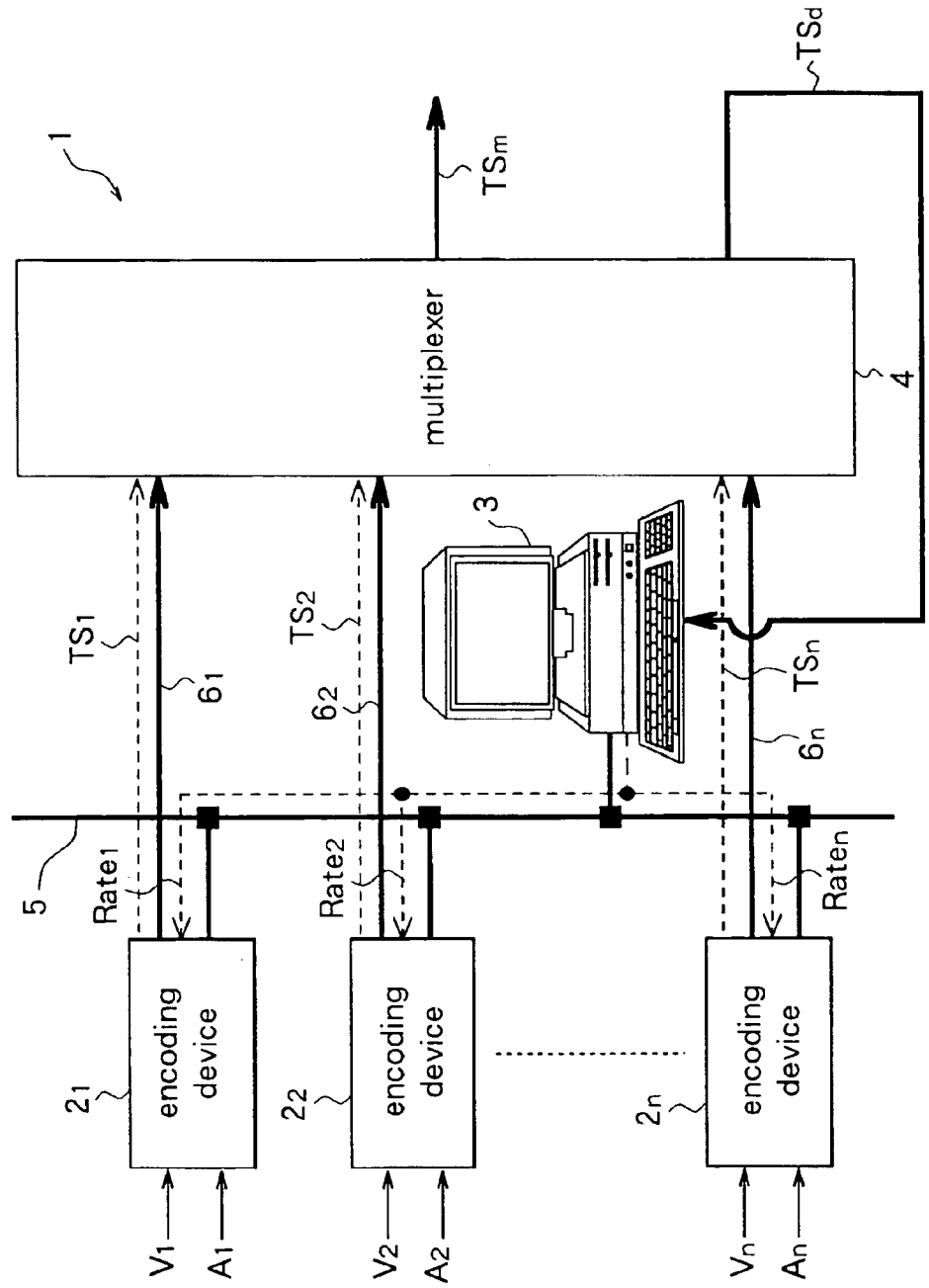
FIG. 7 is a block diagram showing a schematic configuration of a statistical multiplexing system serving as an image data multiplexing device according to an embodiment of the present invention.

FIG. 7 is a block diagram showing a configuration of a statistical multiplexing system serving as an image (video) data multiplexing device according to an embodiment of the present invention. This statistical multiplexing system 1 using a MPEG system, includes: a plurality of encoding devices $2_1$ to $2_n$ as an encoding means inputting video data $V_1$ to $V_n$ (where n is an integer value of at the minimum 2) and audio data $A_1$ to $A_n$ serving as program data in the present invention, conducting compression encoding on the video data and the audio data, and outputting transport streams $TS_1$ to $TS_n$, which are encoded data sequences (encoded streams) in the MPEG system; a statistical multiplexing computer 3 as an encoding control means, connected to the respective encoding devices $2_i$ (where i is an arbitrary integer value ranging 1 to n) via a network, such as an Ethernet 5, and conducting bit rate control of feedforward type; the multiplexer 4 as a multiplexing means, respectively inputting transport streams $TS_i$, respectively outputted from the encoding devices $2_i$ via transmission channels $6_i$, multiplexing the transport streams $TS_i$, and outputting multiplexed transport streams c and $TS_m$ to the statistical multiplexing computer 3 and such as modulator not shown in figures, respectively. In each encoding device $2_i$, a port for the Ethernet 5 is provided. Furthermore, a general purpose computer can be used as the statistical multiplexing computer 3.

The multiplexer 4 acquires encoded data (encoded streams) and data for statistical multiplexing from the respective encoding devices $2_i$ via the transmission channels $6_i$, conducts multiplexing processing on them at a first speed (hereinafter referred to as rate) R1, larger than a data transmission speed (hereinafter referred to as transmission rate), on a transmission channel of a subsequent stage, and outputs the transport stream $TS_d$ serving as first data containing data for statistical multiplexing.

In addition, the multiplexer 4 conducts multiplexing processing on data obtained by removing the data for statistical multiplexing from the data outputted from the respective encoding devices $2_i$, at a second rate R2 which is equal to the transmission rate on the transmission channel of the subsequent stage, and outputs the transport stream $TS_m$ serving as second data which does not contain the data for statistical multiplexing to the transmission channel of the subsequent stage.

Each encoding device $2_i$ encodes inputted video data $V_i$ and audio data $A_i$ while deriving an encoding difficulties $D_i$ concerning an image to be encoded, as data for statistical multiplexing by using the video data $V_i$. Each encoding device $2_i$ converts the encoded video data to a video packet 51, for example, by one packet per one frame, converts the encoded audio data to an audio packet 52, converts the encoding difficulty value $D_i$ to a private packet 53, and outputs them to the multiplexer 4 as the transport stream $TS_i$. In addition, the packet forming the transport stream $TS_i$ is called transport stream packet (hereinafter referred to as TS packet).

The multiplexer 4 multiplexes all packets including the video packets, audio packets, and private packets of the transport streams $TS_1$ to $TS_n$ supplied from n encoding devices $2_1$ to $2_n$, and outputs the multiplexed packets to the statistical multiplexing computer 3 as the transport stream $TS_d$. In addition, the multiplexer 4 outputs the transport stream $TS_m$, obtained by removing the private packets from the multiplexed transport stream $TS_d$, to the modulator and the like via the transmission channel of the subsequent stage.

The statistical multiplexing computer 3 takes out private packets from the transport stream $TS_d$ sent from the multiplexer 4, derives target bit rates $Rate_i$ for the respective encoding devices $2_i$ on the basis of the encoding difficulties obtained from the private packets, and returns target bit rate data representing the target bit rates $Rate_i$ to the respective encoding devices $2_i$. In addition, taking out the private packets can be implemented by hardware, such as an internal board, or software.

On the basis of the target bit rate $Rate_i$ thus set, each encoding device $2_i$ conducts bit rate control and conducts compression encoding on the video data $V_i$.

Figure 8:
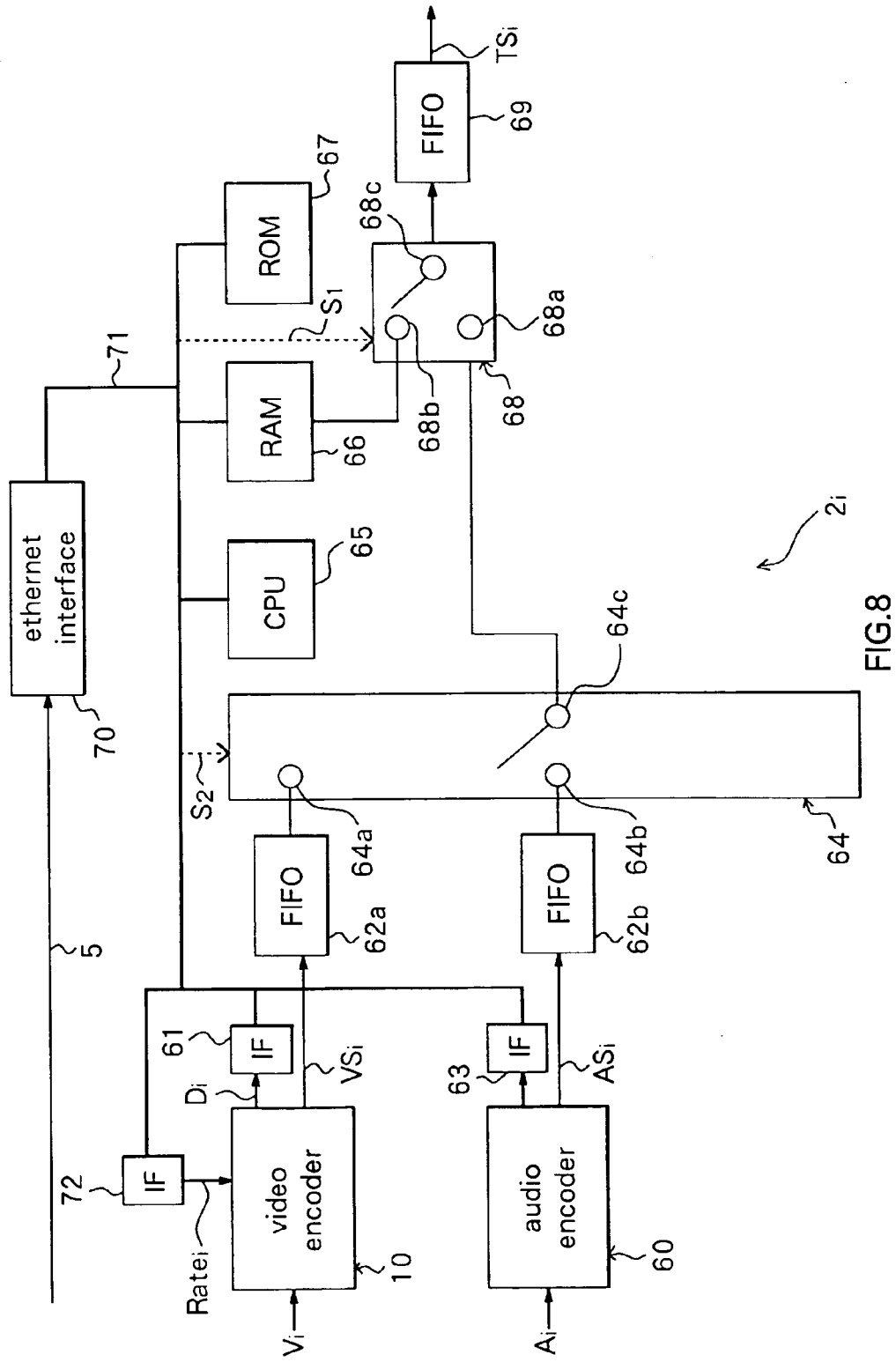
FIG. 8 is a block diagram showing a configuration of an encoding device illustrated in FIG. 7.

FIG. 8 is a block diagram showing a detailed internal configuration of the encoding device $2_i$ illustrated in FIG. 7. As shown in FIG. 8, the encoding device $2_i$ includes: a video encoder 10 for conducting compression encoding on the video data $V_i$ and outputting a video stream $VS_i$; an FIFO (first-in first-out) memory 62a for outputting the video stream $VS_i$ supplied from the video encoder 10 after delaying the video stream for a predetermined time and outputting the delayed video stream, an audio encoder 60 for conducting compression encoding on the audio data $A_i$ and outputting an audio stream $AS_i$; an FIFO (first-in first-out) memory 62b for outputting the audio stream $AS_i$ supplied from the audio encoder 60 delaying for a predetermined time; a switch 64 having one fixed contact 64a connected to the FIFO memory 62a and the other fixed contact 64b connected to the FIFO memory 62b and selectively outputting either the video stream $VS_i$ or the audio stream $AS_i$ from a movable contact 64c thereof; a switch 68 having one fixed contact 68a connected to the movable contact 64c of the switch 64; and a FIFO memory 69 for delaying output data from a movable contact 68c of the switch 68 for a predetermined time and outputting the delayed data as the transport stream $TS_i$.

The encoding device $2_i$ further includes a CPU (central processing unit) 65, a RAM (random access memory) 66 serving as a working area, and a ROM (read only memory) 67, which are connected to each other via a CPU bus 71. The other fixed contact 68b of the switch 68 is connected to the RAM 66.

The encoding device $2_i$ further includes an interface 61 for outputting bits quantity generated per picture frame by the compression encoding in the video encoder 10 onto the CPU bus 71, an interface 63 for outputting data of a quantity generated by the compression encoding in the audio encoder 60 onto the CPU bus 71, an Ethernet interface 70 for inputting private packets transmitted from the statistical multiplexing computer 3 to the image encoding device $2_i$ via the Ethernet 5, and an interface 72 for setting the target bit rate $Rate_i$ in the video encoder 10. The interfaces 61, 63 and 72, and the Ethernet interface 70 are connected to the CPU bus 71, respectively.

On the basis of a switchover instruction signal $S_1$ supplied from the CPU 65 via the CPU bus 71, the switch 64 conducts switchover between the video stream $VS_i$ supplied from the FIFO memory 62a and the audio stream $AS_i$ supplied from the FIFO memory 62b to output the result to the switch 68. On the basis of a switchover instruction signal $S_2$ supplied from the CPU 65 via the CPU bus 71, the switch 68 conducts switchover between output data of the switch 64 and data, such as the encoding difficulties $D_i$, supplied from the RAM 66 to output the result to the FIFO memory 69.

Figure 9:
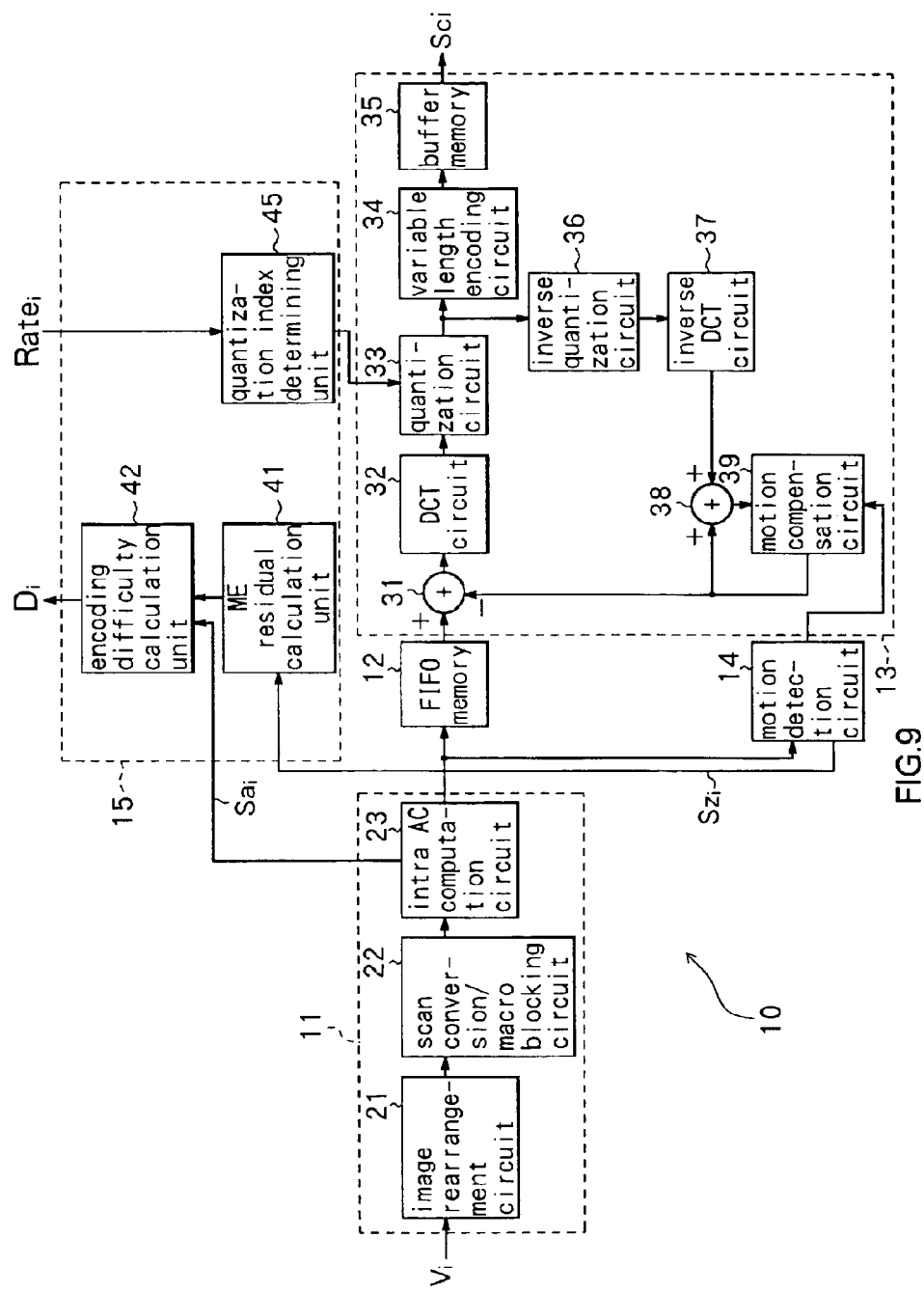
FIG. 9 is a block diagram showing a configuration of a video encoder illustrated in FIG. 8.

FIG. 9 is a block diagram showing a detailed configuration of the video encoder 10 illustrated in FIG. 8. As shown in FIG. 9, the video encoder 10 includes: an encoder control unit 11 for receiving the video data $V_i$ and conducting preprocessing and the like for compression encoding; an FIFO memory 12 for outputting output data of the encoder control unit 11 delaying for a predetermined time; an encoding unit 13 for receiving output data of the FIFO memory 12, conducting compression encoding by an encoding method according to a picture type of each picture, and outputting the video stream $VS_i$ which is an encoded data sequence; a motion detection circuit 14 for detecting a motion vector on the basis of the output data of the encoder control unit 11 and sending the result to the encoding unit 13; and an encoding control unit 15 for controlling the encoding unit 13 on the basis of intra AC data $Sa_i$ outputted from the encoder control unit 11 and ME residual data $Sz_i$ outputted from the motion detection circuit 14.

The encoder control unit 11 includes: an image rearrangement circuit 21 for receiving the video data $V_i$ and rearranging the order of pictures (I picture, P picture, and B picture) according to the order of encoding, a scan conversion/macro blocking circuit 22 for receiving output data of the image rearrangement circuit 21, determining whether the output data has a frame structure or a field structure, conducting scan conversion and macro blocking of 16×16 pixels according to the result of the determination; and an intra AC computation circuit 23 for receiving output data of the scan conversion/macro blocking circuit 22, calculating intra AC in the I picture, sending intra AC data $Sa_i$ to the encoding control unit 15, while sending the output data of the scan conversion/macro blocking circuit 22 to the FIFO memory 12 and the motion detection circuit 14. In addition, the intra AC is defined in the I picture as sum total of absolute values of difference values between pixel values of respective pixels in an 8×8 pixel DCT (discrete cosine transform) block and a mean value of pixel values in the DCT block. It can be said that the intra AC represents the degree of complication.

The encoding unit 13 includes: a subtraction circuit 31 deriving a difference between the output data of the FIFO memory 12 and predicted image data; a DCT circuit 32 conducting DCT on output data of the subtraction circuit 31, taking a DCT block as a unit and outputting a DCT coefficient; a quantization circuit 33 quantizing output data of the DCT circuit 32; a variable length encoding circuit 34 conducting variable length encoding on output data of the quantization circuit 33; a buffer memory 35 temporarily holding output data of the variable length encoding circuit 34 and outputting it as the video stream $VS_i$; an inverse quantization circuit 36 conducting inverse quantization on the output data of the quantization circuit 33; an inverse DCT circuit 37 conducting inverse DCT on output data of the inverse quantization circuit 36; an addition circuit 38 adding output data of the inverse DCT circuit 37 to the predicted image data and outputting the resultant sum; and a motion compensation circuit 39 for holding output data of the addition circuit 38, conducting motion compensation according to the motion vector sent from the motion detection circuit 14, and outputting predicted image data to the subtraction circuit 31 and the addition circuit 38.

On the basis of the output data of the encoder control unit 11, the motion detection circuit 14 searches for a target macro block of a picture to be subjected to compression encoding, and a macro block, that the sum of absolute values or the sum of squared values of difference values of pixel value between the macro block and the noticeable macro block, becomes minimum in the referred picture, and detects the motion vector and sends it to the motion compensation circuit 39. Furthermore, when deriving the motion vector, the motion detection circuit 14 sends the sum of absolute values or the sum of squared values of difference values in pixel value, between the macro block providing the minimum value and the target macro block, to the encoding control unit 15 as the ME residual data $Sz_i$.

The encoding control unit 15 includes a ME residual calculation unit 41 for calculating an ME residual which is the value of adding the ME residual data $Sz_i$ together supplied from the motion detection circuit 14 over the whole picture, and an encoding difficulty calculation unit 42 for calculating an encoding difficulty value $D_i$ representing the encoding difficulty of the picture, on the basis of the ME residual calculated by the ME residual calculation unit 41 and the intra AC data $Sa_i$ supplied from the intra AC computation circuit 23, and outputting the encoding difficulty value $D_i$ to the interface 61.

The encoding control unit 15 further includes a quantization index determining unit 45 for determining a quantization index corresponding to a quantization characteristic value in the quantization circuit 33 so as to make the bit rate equal to the target bit rate $Rate_i$ extracted from the target bit rate data which is sent from the statistical multiplexing computer 3, and sending the determined quantization index to the quantization circuit 33.

Figure 10:
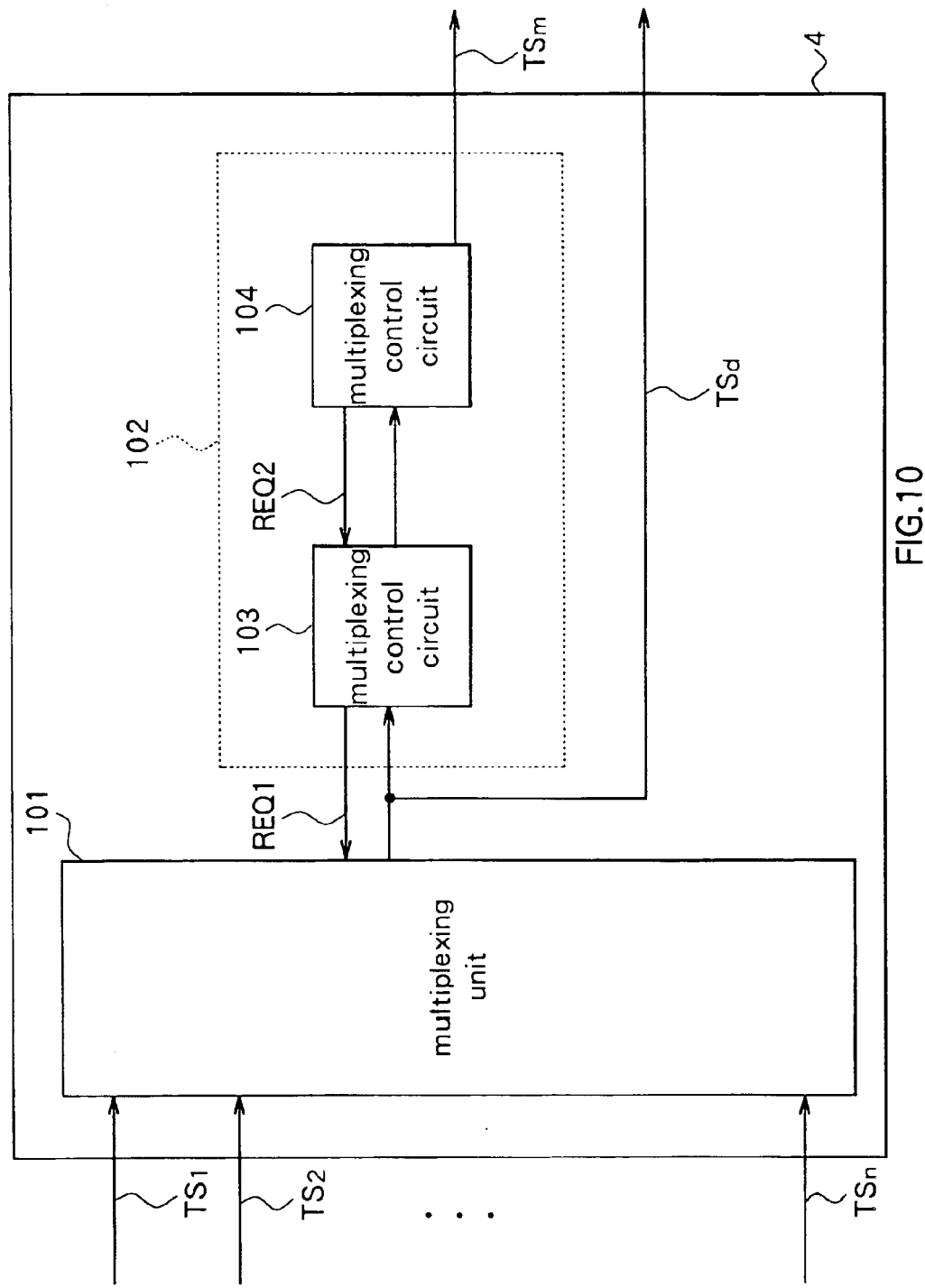
FIG. 10 is a block diagram showing a configuration of a multiplexer in an embodiment of the present invention.

FIG. 10 is a block diagram showing a detailed internal configuration of the multiplexer 4. As shown in FIG. 10, the multiplexer 4 includes: a multiplexing unit 101 acquiring the transport streams $TS_i$ from the respective encoding devices $2_i$ via the transmission channels $6_i$, conducting multiplexing processing on them, and outputting the transport stream $TS_d$ including private packets; and a private packet removing unit 102 removing the private packets from data multiplexed by the multiplexing unit 101 and outputting resultant data, to the modulator and the like via the transmission channel of the subsequent stage, as the transport stream $TS_m$.

The private packet removing unit 102 includes a multiplexing control circuit 103, serving as a first multiplexing control unit, for controlling the multiplexing unit 101 so as to output the transport stream $TS_d$ from the multiplexing unit 101 at the first rate R1 and holding data obtained by removing private packets from the transport stream $TS_d$ outputted from the multiplexing unit 101; and a multiplexing control circuit 104 for controlling the multiplexing control circuit 103 so as to output the data held by the multiplexing control circuit 103 to the transmission channel of the subsequent stage at the second rate R2, as the transport stream $TS_m$.

Figure 11:
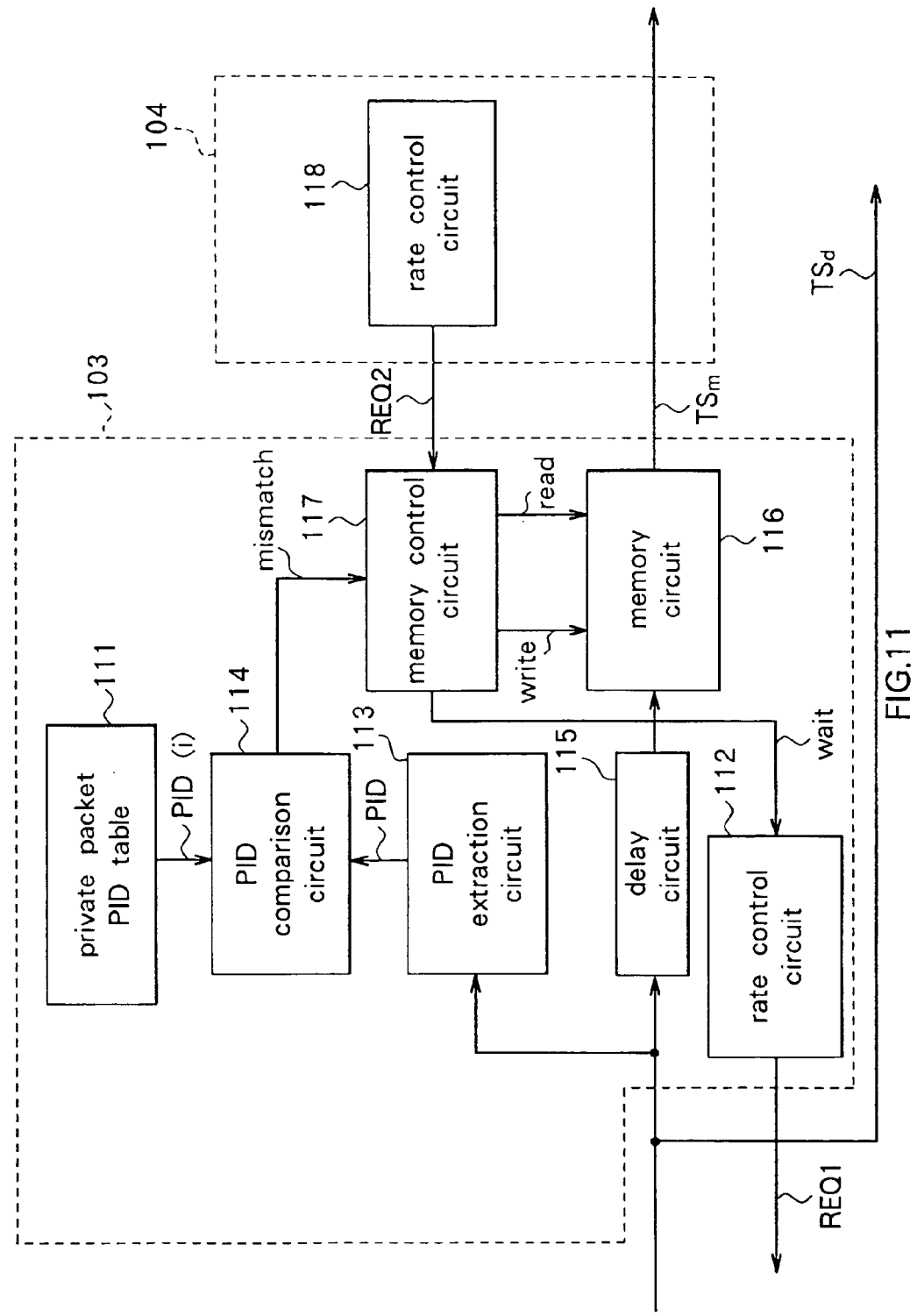
FIG. 11 is a block diagram showing a configuration of a multiplexing control circuit illustrated in FIG. 10.

FIG. 11 is a block diagram showing detailed configurations of the multiplexing control circuits 103 and 104 illustrated in FIG. 10. As shown in FIG. 11, the multiplexing control circuit 103 includes: a private packet PID table 111 holding packet identification information (hereinafter referred to also as PID) (i) of private packets of each encoding device $2_i$; a rate control circuit 112 for sending a request signal REQ1 requesting the multiplexing unit 101 to send packets; a PID extraction circuit 113 extracting a PID from a packet outputted from the multiplexing unit 101 and outputting the PID; a PID comparison circuit 114 comparing the PID, outputted from the PID extraction circuit, with the PID (i) registered in the private packet PID table 111; a delay circuit 115 receiving a packet outputted from the multiplexing unit 101, outputting the packet, delaying for a time period until a comparison result is obtained in the PID comparison circuit 114; a memory circuit 116 temporarily holding the packet outputted from the delay circuit 115 for the rate conversion; and a memory control circuit 117 controlling the memory circuit 116.

The PID comparison circuit 114 sends a noncoincidence signal "mismatch" to the memory control circuit 117 when the PID outputted from the PID extraction circuit 113 does not coincide with the PID (i) registered in the packet PID table 111. In the case of coincidence, the PID comparison circuit 114 does not send the noncoincidence signal "mismatch" to the memory control circuit 117. Upon receiving the noncoincidence signal "mismatch," the memory control circuit 117 sends a write signal "write" to the memory circuit 116. Upon receiving the write signal "write," the memory circuit 116 writes the packet outputted from the delay circuit 115 therein. Through this operation, packets other than the private packet 53 are written into the memory circuit 116.

The multiplexing control circuit 104 includes a rate control circuit 118 for sending a request signal REQ2 requesting the memory control circuit 117 to send packets. Upon receiving the request signal REQ2, the memory control circuit 117 sends a read signal "read" to the memory circuit 116. Each time when the memory circuit 116 receives the read signal "read," the memory circuit 116 reads the packets held therein one by one in written order, and outputs the packets as the transport stream $TS_m$. This transport stream $TS_m$ passes through the multiplexing control circuit 104 and is outputted from the private packet removing unit 102.

The rate control circuit 112 sends the request signal REQ1 to the multiplexer 4 so as to make the transport stream $TS_d$ be outputted from the multiplexing unit 101 at a rate R1 which is larger than the sum of a transmission rate Rt on the transmission channel of the stage subsequent to the multiplexer 4 and a rate Rp of the private packet. The relationship of the rates Rt, Rp and R1 is shown by the following expression (3).

$$R1 \geq Rt + Rp \qquad (3)$$

On the other hand, the rate control circuit 118 sends the request signal REQ2 to the memory control circuit 117 so as to make the transport stream $TS_m$ be outputted from the memory circuit 116 at a rate equal to the transmission rate Rt. The relationship of the rates R1 and R2 is shown by the following expression (4).

$$R1 > R2 \tag{4}$$

Furthermore, the memory control circuit 117 monitors the number of packets entering and exiting the memory circuit 116 so as to send a wait signal "wait" to the rate control circuit 112 when the memory circuit is likely to overflow, the memory control circuit 117. Upon receiving the wait signal "wait," the rate control circuit 112 does not issue the request signal REQ1 even if it's a timing of issuing the request signal REQ1.

Figure 12:
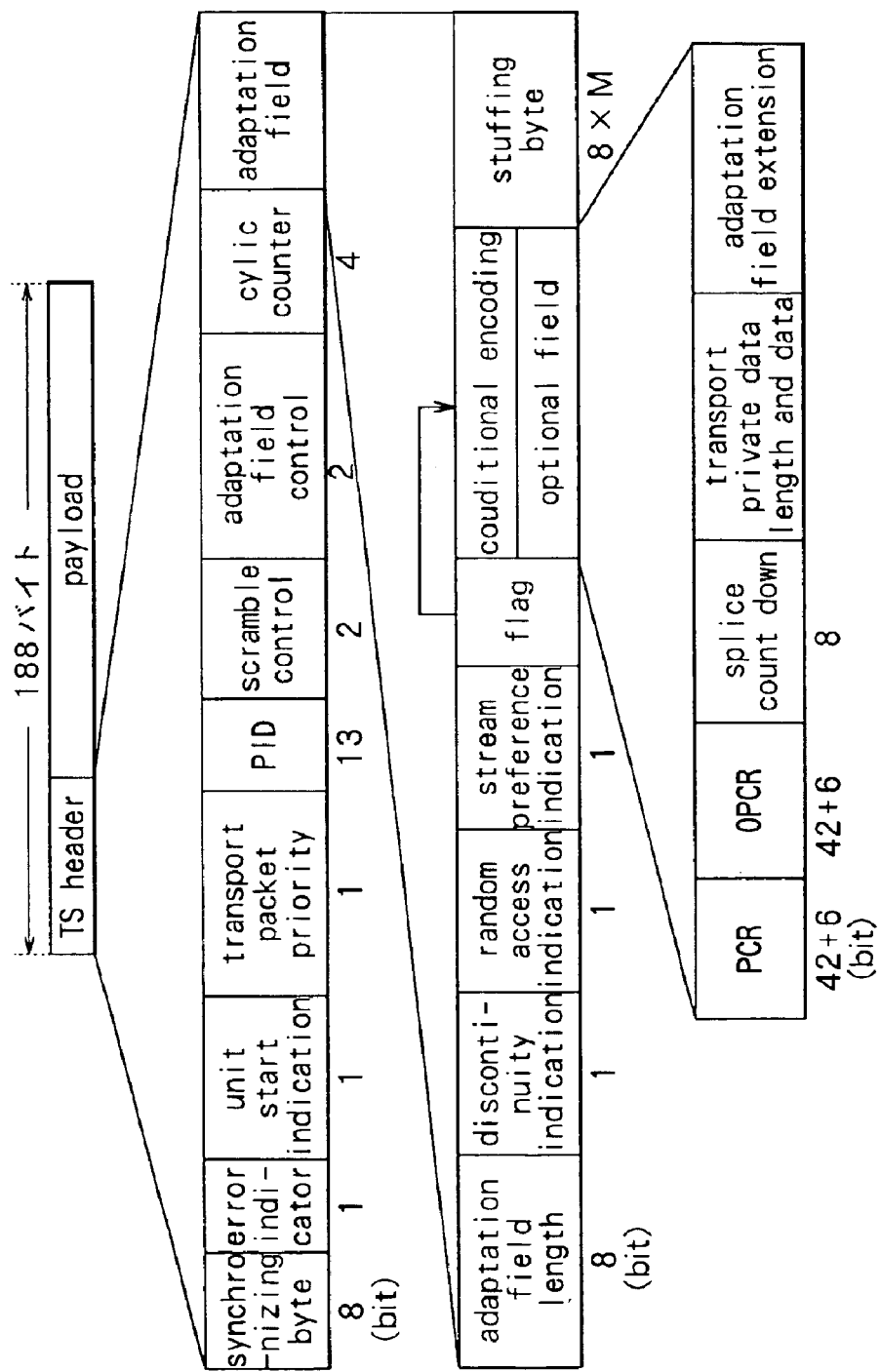
FIG. 12 is a diagram showing a configuration of a TS packet.

By referring to FIG. 12, a configuration of a TS packet will be described briefly. The TS packet is formed of a transport header section (hereinafter referred to as TS header section) of 4 bytes and a payload section in which actual data of 184 bytes are recorded. As a whole, the TS packet has 188 bytes. The TS header section is formed of a synchronizing byte having 8 unique bits for indicating the start of the TS packet; an error indicator section for indicating whether a bit error is present or not in the TS packet; a unit start indication section for indicating whether a head of a packetized elementary stream (PES) packet is present in this TS packet; a transport packet priority section for indicating the degree of importance of this TS packet; a PID section for storing a PID indicating the kind of stream data accommodated in the payload section of this TS packet; a scramble control section for indicating whether the stream data accommodated in the payload section has been subjected to scrambling or not; an adaptation field control section for indicating whether an adaptation field section and the payload section are present or not; a cyclic counter section for storing cyclic counter information used to detect whether a TS packet having the same PID has been rejected on the way or not; and an adaptation field section for storing various kinds of control information.

The adaptation field section is formed of: an adaptation field length indicating the length of the adaptation field section; a discontinuity indicating section for indicating whether time information has been reset in a TS packet of the same stream subsequent to this TS packet; a random access indicating section for indicating whether this TS packet is an entry point of random access or not; a stream preference indicating section indicating whether an important part of the stream data has been stored in the payload section of this TS packet or not; a flag control section for storing flag information concerning a conditional encoding section; a conditional encoding section for storing reference time information called PCR (Program Clock Reference), reference time information called OPCR (Original Program Clock Reference), or information such as splice count down indicating an index as far as a data replacement point, and a stuffing byte section for stuffing invalid data bytes in order to adjust the data length.

Figure 13:
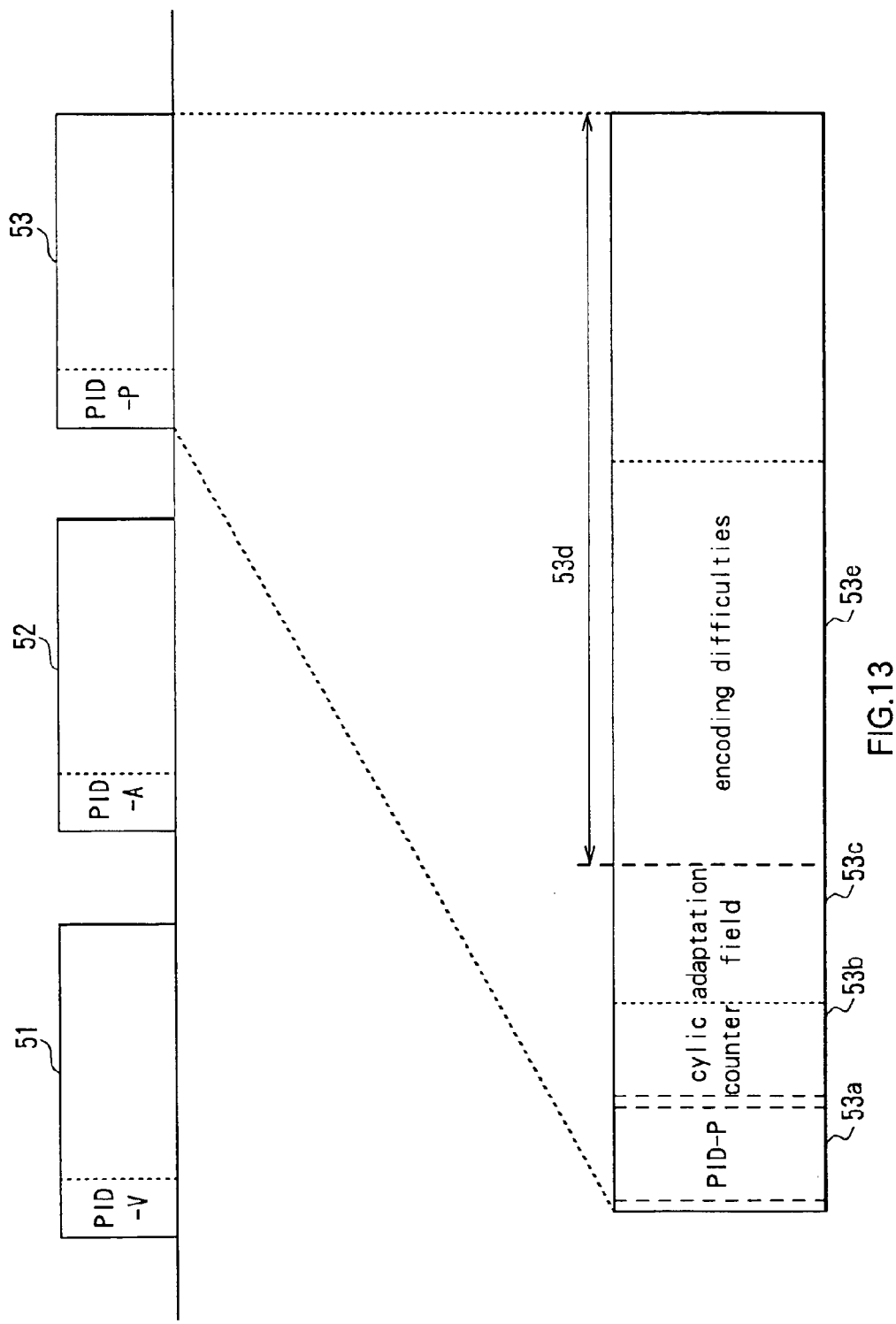
FIG. 13 is a diagram for description of contents of a private packet in an embodiment of the present invention.
Figure 14:
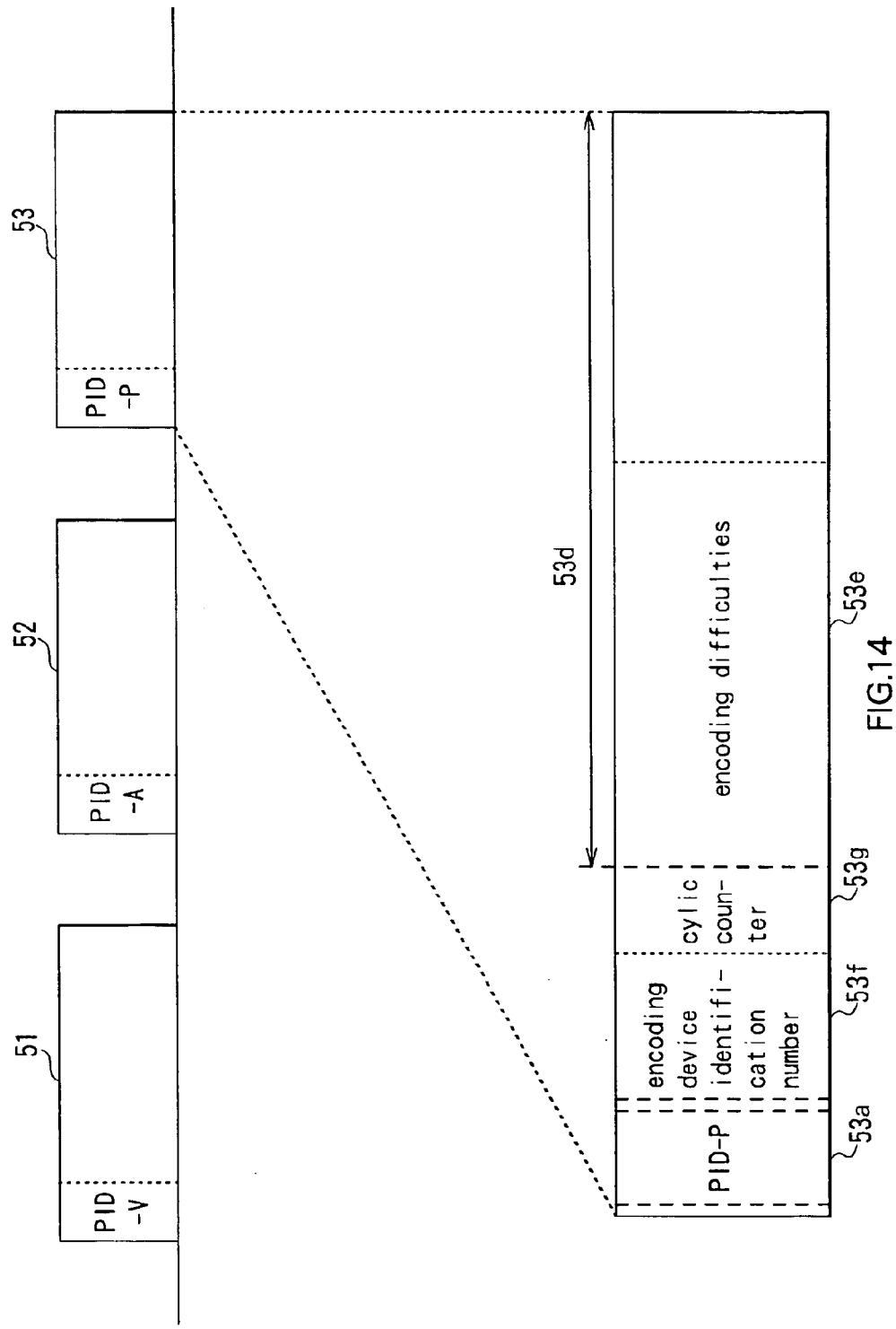
FIG. 14 is a diagram for description of contents of a private packet in an embodiment of the present invention.

By referring to FIGS. 13 and 14, contents of a private packet in the present embodiment will now be described. FIGS. 13 and 14 represent data formed as packets (TS packets) on a transmission channel. In case that the transmission channel $6_i$ is, for example a serial transmission channel of 270 Mbit/second called DVB-Serial-ASI (Asynchronous Serial Interface) defined in DVB-TM (exactly speaking, Interfaces for CATV/SMATV Headends and similar Professional Equipment issued by DVB-TM Ad hoc Group Physical Interface), data are carried intermittently as shown in FIGS. 13 and 14. In the examples shown in FIGS. 13 and 14, a video packet 51, an audio packet 52, and a private packet 53 are illustrated as intermittent data. In each of these packets, the head portion of which is a TS header section as described above, and the other portion than the TS header section is a payload section. In the payload section, actual data is described.

In the TS header section, a PID is described. The PID is an identification (ID) number of a packet defined in the MPEG standards in order to identify the attribute of the packetized data. The PID must be set for each of video channels and each of audio channels. In the present embodiment, it is necessary to secure an individual PID for the private packet as well. In FIGS. 13 and 14, a PID of the video packet 51 is represented as PID-V, a PID of the audio packet 52 is represented as PID-A, and a PID of the private packet 53 is represented as PID-P.

In case that the encoding difficulties of each encoding device $2_i$ is transmitted by using the private packet, it is necessary to make it possible to determine from which encoding device $2_i$ the encoding difficulties is supplied. As the method for that purpose, the following two methods are conceivable.

The first method is a method to use a PID section in a TS header section is used. FIG. 13 shows simplified contents of the private packet 53. As shown in FIG. 13, the private packet 53 includes a PID section 53a in its TS header section, a cyclic counter section 53b, an adaptation field section 53c, and a payload section 53d. In the payload section 53d, an encoding difficulties 53e is included. In the first method, as many PIDs as the encoding devices $2_i$ are secured, and one PID is set for each encoding device $2_i$ in the PID section 53a shown in FIG. 13. In this case, the statistical multiplexing computer 3 receives encoding difficulties respectively for specified PIDs, and calculates target bit rates $Rate_i$ respectively for the encoding devices $2_i$. Furthermore, in this method, packet rejection is detected by using cyclic counter information stored in the cyclic counter section 53b shown in FIG. 13. Since the cyclic counter information is provided in a transport layer in this method, it becomes possible to detect the packet rejection on the transport layer level. Furthermore, in this method, it is necessary to secure as many PIDs as the encoding devices $2_i$, and in addition, it is necessary to conduct removal of private packets from the transport stream $TS_i$ by using as many PIDs as the encoding devices $2_i$.

The second method is a method securing one PID with regard to all private packets determining an encoding device identification number for each encoding device $2_i$ separately from the PID, and identifying from which encoding device $2_i$ the encoding difficulty is supplied by using the identification number. In FIG. 14, contents of the payload section 53d of the private packet 53 when the second method is used are shown. In this case, the payload section 53d includes: an encoding device identification number 53f for identifying from which encoding device $2_i$ the encoding difficulties is supplied; a cyclic counter 53g provided besides the cyclic counter in the transport layer, in order to detect whether packet rejection has been conducted or not; and encoding difficulties 53e supplied from the respective encoding devices $2_i$.

Figure 15:
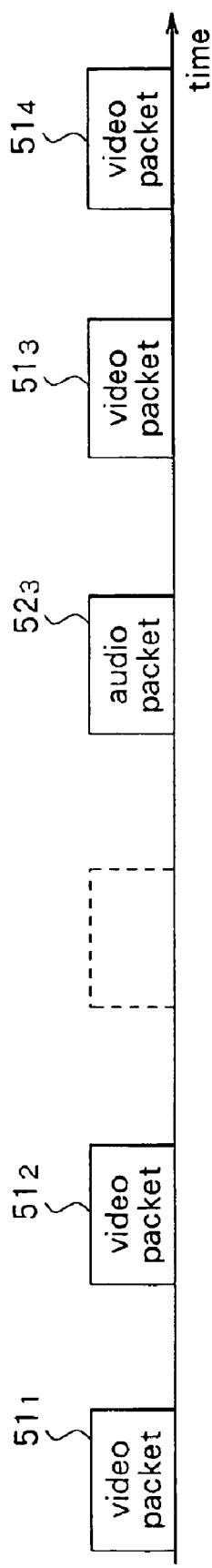
FIG. 15 is a diagram showing a transport stream in case that private packets are simply removed from all TS packets.

By the way, the private packet, containing the encoding difficulty values, is not transmitted to the receiving side as it is data which is not used on the receiving side, but used only on the sending side. FIG. 15 shows an example of the transport stream transmitted to the receiving side when the private packets containing the encoding difficulty values are simply removed from all TS packets in the multiplexer 4. In this example, a video packet $51_1$ supplied from the encoding device $2_1$, and a video packet $51_2$ supplied from the encoding device $2_2$ are successively transmitted. Then, a space corresponding to one packet of the removed private packet is transmitted. Then, an audio packet $52_3$ supplied from the encoding device $2_3$, a video packet $51_3$ supplied from the encoding device $2_3$, and a video packet $51_4$ supplied from the encoding device $2_4$ are transmitted sequentially.

Figure 16:
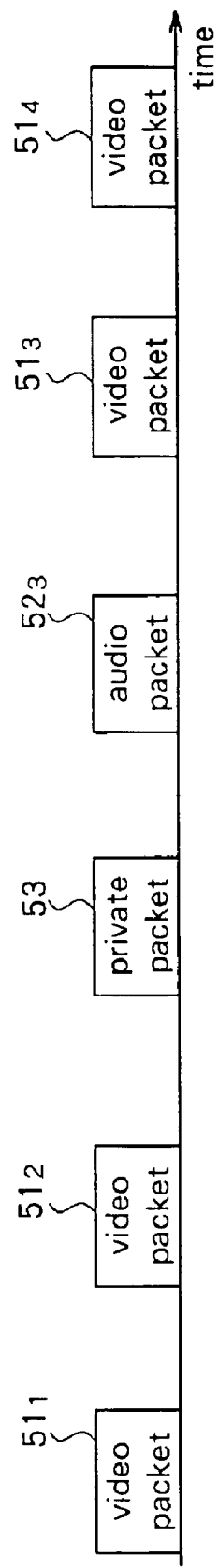
FIG. 16 is a diagram showing a transport stream containing the private packet.

On the other hand, FIG. 16 shows an example of a transport stream containing the private packets sent to the statistical multiplexing computer 3. In this example, a video packet $51_1$ supplied from the encoding device $2_1$, and a video packet $51_2$ supplied from the encoding device $2_2$ are successively transmitted. Then, a private packet 53 is transmitted. Then, an audio packet $52_3$ supplied from the encoding device $2_3$, a video packet $51_3$ supplied from the encoding device $2_3$, and a video packet $51_4$ supplied from the encoding device $2_4$ are transmitted one after another.

In the case of the transport stream as shown in FIG. 15, a time slot in which the private packet existed becomes a blank. Therefore, the transmission efficiency drops, resulting in the occurrence of an overhead of the private packets, i.e. an extra time used to control the private packets occurs.

Here, the ratio of the private packets for conducting control using the statistical multiplexing occupying the transmission rate will now be considered. If one frame (1/30 second) is taken as a unit for control, data (encoding difficulty) for statistical multiplexing corresponding to one packet is generated at intervals of that time. For example, assuming that one packet is 188 bytes, one encoding device 2' occupies the rate of 188×30=0.045 (*Mbps*).

When packets are transmitted from 10 encoding devices to one multiplexer 4, the rate of the private packets for conducting control using the statistical multiplexing increases to 10 times, becoming 0.45 Mbps. Since the transmission rate has a band of approximately 30 Mbps in the ordinary digital CS broadcasting or the like, an overhead of the private packets equivalent to approximately 1.5% occurs. Furthermore, when more complicated control is attempted, the number of packets increases to several times and the overhead of the private packets is expected to occupy several percents of the band. Originally, utilization of 100% of the band is ideal, but as a matter of fact, several percents of unutilized part of band exist. Moreover when the rate of several percents is occupied by the overhead of the private packets, the efficiency of the transmission rate is further aggravated.

In the present embodiment, therefore, data supplied from the respective encoding devices 2' are multiplexed by the multiplexer 4 at a first rate R1 larger than the transmission rate on the transmission channel of the subsequent stage to output the transport stream $TS_d$ containing the private packets for statistical multiplexing to the statistical multiplexing computer 3. In addition, data obtained by removing the private packets for statistical multiplexing from the data outputted from the respective encoding devices 2; are multiplexed by the multiplexer 4 at a second rate R2 equivalent to the transmission rate on the transmission channel of the subsequent stage to output the transport stream $TS_m$ not containing the private packets for statistical multiplexing to the transmission channel of the subsequent stage.

Operation of the statistical multiplexing system 1 shown in FIG. 7 will now be described. The following description serves also as description of the image data multiplexing control method according to the present embodiment. In this statistical multiplexing system 1, the video data $V_i$ and the audio data $A_i$ are encoded by each encoding device $2_i$. For each video data $V_i$, each encoding device $2_i$ forms the private packet 53 containing the encoding difficulties $D_i$ which represents the encoding difficulty concerning the image to be encoded. Along with the video packet 51 of encoded video data and the audio packet 52 of encoded audio data, each encoding device $2_i$ outputs the private packet 53 to the multiplexer 4 via the transmission channel $6_i$ as the transport stream $TS_i$.

Subsequently, as shown in FIG. 10, the multiplexer 4 multiplexes the transport streams $TS_1$ to $TS_n$ supplied from the encoding devices $2_i$ in the multiplexing unit 101, and generates the multiplexed transport stream $TS_d$. The transport stream $TS_d$ includes the private packet 53 containing the encoding difficulties $D_1$ to $D_n$ therein, and is sent to the statistical multiplexing computer 3 in order to conduct the control using the statistical multiplexing. Furthermore, the transport stream $TS_d$ is inputted to the private packet removing unit 102 as well. From this private packet removing unit 102, the transport stream $TS_m$ obtained by removing the private packet 53 from the transport stream $TS_d$ is outputted to the modulator and the like via the transmission channel of the subsequent stage.

The statistical multiplexing computer 3 only takes out the private packet 53 having the encoding difficulties $D_1$ to $D_n$ in a packet form from the inputted transport stream $TS_d$. The statistical multiplexing computer 3 determines the target bit rate $Rate_i$ for each video data $V_i$ by using a statistical multiplexing technique on the basis of the encoding difficulty $D_i$ described in the private packet thus taken out. The statistical multiplexing computer 3 derives the target bit rates $Rate_i$ to $Rate_n$ for all encoding devices $2_1$ to $2_n$, and sends them to all encoding devices $2_1$ to $2_n$ via the Ethernet 5 as target bit rate data. From the target bit rate data, each encoding device $2_i$ extracts the target bit rate $Rate_i$ for the encoding device $2_i$. On the basis of the target bit rate $Rate_i$, each encoding device $2_i$ conducts compression encoding on the video data $V_i$, and outputs the transport stream $TS_i$ to the multiplexer 4. The multiplexer 4 multiplexes the inputted transport streams $TS_i$, and outputs the transport streams $TS_m$ and $TS_d$.

Operation conducted by the encoding device $2_i$ shown in FIG. 8 in this case will now be described in detail. First of all, the video stream $VS_i$ supplied from the video encoder 10 is outputted to the FIFO memory 62a. Along with the amount of bits generated by compression encoding, the encoding difficulty value $D_i$ is outputted to the interface 61. Along with the amount of generated bits, the encoding difficulty value $D_i$ is written into the RAM 66 from the interface 61 via the CPU bus 71 by the CPU 65. The audio stream $AS_i$ supplied from the audio encoder 60 is outputted to the FIFO memory 62b.

By the switchover signal $S_2$, the CPU 65 controls the switch 64 and thereby selectively outputs one of the video stream $VS_i$ and the audio stream $AS_i$. Furthermore, by using the switchover signal $S_1$, the CPU 65 controls the switch 68 and thereby selectively outputs one of the output data of the switch 64 and the data supplied from the RAM 66 to the FIFO memory 69. By the way, the data supplied from the RAM 66 includes the data described in the packet header and the encoding difficulty $D_i$.

Thus, a packet header is added to the video stream $VS_i$ to generate a video packet, a packet header is added to the audio stream $AS_i$ to generate an audio packet, and a packet header is added to the encoding difficulty $D_i$ to generate a private packet at the switch 68. Each packet thus generated is outputted to the transmission channel $6_i$ via the FIFO memory 69 and is transmitted to the multiplexer 4 as the transport stream $TS_i$. By the way, information such as the PID, adaptation field, and the cyclic counter required for packet forming are outputted from the RAM 66 to the switch 68.

Furthermore, to the Ethernet interface 70, the target bit rate data derived in the multiplexing computer 3 are transmitted via the Ethernet 5. The CPU 65 temporarily writes the target bit rate data into the RAM 66 via the CPU bus 71, extracts a pertinent target bit rate $Rate_i$, and sends it to the quantization index determining unit 45 of the video encoder 10 via the interface 72. On the basis of the target bit rate $Rate_i$, the video encoder 10 conducts compression encoding on the video data $V_i$.

Operation of the video encoder 10 shown in FIG. 9 will now be described. First of all, the video data $V_i$ is inputted to the encoder control unit 11 of the video encoder 10. In the encoder control unit 11, the order of pictures (I picture, P picture, and B picture) is rearranged according to the order of being encoded by the image rearrangement circuit 21 and discrimination whether the video data has a frame structure or a field structure is performed by the scan conversion/macro blocking circuit 22, and conducts scan conversion and macro blocking according to a result of the discrimination. In the case of the I picture, according to the intra AC computation circuit 23, intra AC is calculated and the intra AC data $Sa_i$ is sent to the encoding difficulty calculation unit 42 of the encoding control unit 15. Furthermore, the output data of the scan conversion/macro blocking circuit 22 is sent to the FIFO memory 12 and the motion detection circuit 14 via the intra AC computation circuit 23.

The FIFO memory 12 delays the inputted image data for a time period required for the encoding difficulty calculation unit 42 to calculate the encoding difficulties of pictures of N frames subsequent to the picture which has been finished the encoding, and then outputs the image data to the encoding unit 13. The motion detection circuit 14 detects a motion vector and sends it to the motion compensation circuit 39, while sending the ME residual data $Sz_i$ to the ME residual calculation unit 41 of the encoding control unit 15. On the basis of the ME residual data $Sz_i$, the ME residual calculation unit 41 calculates the ME residual, and outputs it to the encoding difficulty calculation unit 42.

On the basis of the intra AC data $Sa_i$ and the ME residual, the encoding difficulty calculation unit 42 calculates the encoding difficulty value $D_i$ and outputs it to the interface 61.

In the case of the I picture, in the encoding unit 13, the output data of the FIFO memory 12 is inputted to the DCT circuit 32 as it is, and subjected to the DCT therein without deriving a difference between the I picture and predicted image data in the subtraction circuit 31. The DCT coefficient is quantized by the quantization circuit 33. Output data of the quantization circuit 33 is subjected to variable length encoding. Output data of the variable length encoding circuit 34 is temporarily held by the buffer memory 35, and outputted as the video stream $VS_i$ consists of bit stream. The output data of the quantization circuit 33 is subjected to inverse quantization in the inverse quantization circuit 36. Output data of the inverse quantization circuit 36 is subjected to inverse DCT in the inverse DCT circuit 37. And output image data of the inverse DCT circuit 37 is inputted to the motion compensation circuit 39 via the addition circuit 38, and held therein.

In the case of a P picture, in the encoding unit 13, the motion compensation circuit 39 generates predicted image data on the basis of image data corresponding to a past I picture or P picture which is held and the motion vector supplied from the motion detection circuit 14, and the predicted image data is outputted to the subtraction circuit 31 and the addition circuit 38. Also, a difference between the output data of the FIFO memory 12 and the predicted image data supplied from the motion compensation circuit 39 is derived by the subtraction circuit 31, and is subjected to DCT in the DCT circuit 32. The DCT coefficient is quantized by the quantization circuit 33. Output data of the quantization circuit 33 is subjected to variable length encoding by the variable length encoding circuit 34. Output data of the variable length encoding circuit 34 is temporarily held and outputted as the video stream $VS_i$ by the buffer memory 35. Furthermore, output data of the quantization circuit 33 is subjected to inverse quantization in the inverse quantization circuit 36. Output data of the inverse quantization circuit 36 is subjected to inverse DCT in the inverse DCT circuit 37. Output data of the inverse DCT circuit 37 and the predicted image data are added by the addition circuit 38. A resultant sum signal is inputted to the motion compensation circuit 39, and held therein.

In the case of a B picture, in the encoding unit 13, the motion compensation circuit 39 generates predicted image data on the basis of two image data corresponding to the I picture or P picture of the past and future which are held and two motion vectors supplied from the motion detection circuit 14, and outputs the predicted image data to the subtraction circuit 31 and the addition circuit 38. Furthermore, a difference between the output data of the FIFO memory 12 and the predicted image data supplied from the motion compensation circuit 39 is derived by the subtraction circuit 31, and is subjected to DCT in the DCT circuit 32. The DCT coefficient is quantized by the quantization circuit 33. Output data of the quantization circuit 33 is subjected to variable length encoding by the variable length encoding circuit 34. Output data of the variable length encoding circuit 34 is temporarily held and outputted as the video stream $VS_i$ by the buffer memory 35. The B picture is not held in the motion compensation circuit 39.

So as to accomplish the target bit rate $Rate_i$ acquired from the interface 72 and set, the quantization index determining unit 45 determines the quantization index corresponding to the quantization characteristic value in the quantization circuit 33, and sends it to the quantization circuit 33. As a result, control using the statistical multiplexing is conducted.

Next, operation of the multiplexing control circuits 103 and 104 illustrated in FIG. 11 will now be described. First of all, as many PIDs of the private packets of the number as required are registered in the private packet PID table 111 of the multiplexing control circuit 103 beforehand. The rate control circuit 112 outputs the request signal REQ1 to the multiplexer 4 at timing conformed to a rate R1 larger than the sum of the transmission rate Rt and the rate Rp of the private packet 53. The multiplexer 4 transmits a packet according to the request signal REQ1. The sent packet becomes the transport stream $TS_d$ containing the private packet 53, and is outputted to the statistical multiplexing computer 3 while is also outputted to the PID extraction circuit 113 and the delay circuit 115.

The PID extraction circuit 113 extracts a PID out of packets, and outputs the extracted PID to the PID comparison circuit 114. The PID comparison circuit 114 compares the PID outputted from the PID extraction circuit 113 with the PID (i) registered in the private packet PID table 111. In the case of noncoincidence, the PID comparison circuit 114 sends a noncoincidence signal "mismatch" to the memory control circuit 117 and in the case of coincidence, does not send the noncoincidence signal "mismatch" to the memory control circuit 117. Upon receiving the noncoincidence signal "mismatch," the memory control circuit 117 sends the write signal "write" to the memory circuit 116. Upon receiving the write signal "write," the memory circuit 116 writes the packet outputted from the delay circuit 115. As a result of these operations, packets except the private packet 53 are written into the memory circuit 116. In addition, the delay circuit 115 delays the packet for a time period until a result of comparison is obtained in the PID comparison circuit 114, and outputs the packet.

The rate control circuit 118 in the multiplexing control circuit 104 outputs the request signal REQ2 to the memory control circuit 117, at timing conformed to a rate R2 equivalent to the transmission rate Rt. Upon receiving the request signal REQ2, the memory control circuit 117 sends the read signal "read" to the memory circuit 116. Each time the memory circuit 116 receives the read signal "read," the memory circuit 116 reads out the held packets one by one in written order, and outputs them as the transport stream $TS_m$. This transport stream $TS_m$ passes through the multiplexing control circuit 104 and is outputted from the private packet removing unit 102. This transport stream $TS_m$ becomes a transport stream which does not contain the private packet 53. Transmission rates of the transport streams $TS_d$ and $TS_m$ become R1 and R2, respectively.

Since the transport stream inputted to the multiplexer 4 is subjected to the rate control, the memory circuit 116 normally does not overflow. However, there is also a possibility of occurrence of such an error that the memory circuit 116 overflows, since operation is conducted in such a state that the rate R1 is larger than the rate R2 (R1>R2). Therefore in order to avoid the overflow of the memory circuit 116, the following control is conducted.

That is, the memory control circuit 17 monitors the number of packets entering and exiting the memory circuit 116 and sends the wait signal "wait" to the rate control circuit 112 when the memory circuit is likely to overflow. Upon receiving the wait signal "wait," the rate control circuit 112 does not issue the request signal REQ1 even at timing for issuing the request signal REQ1. While the wait signal "wait" is being received, a packet is not supplied from the delay circuit 115 to the memory circuit 116, and consequently a packet is not written into the memory circuit 116 and in the memory circuit 116, only the read operation is conducted. As a result, the memory circuit 116 is avoided from overflowing. When the memory control circuit 117 determines that the monitored number of packets is not a number causing overflow, it stops sending the wait signal "wait." When sending of the wait signal "wait" is suspended, the rate control circuit 112 sends the request signal REQ1 at timing conformed to the rate R1. According to such a control method, the memory circuit 116 operates without overflowing no matter how much the rate R1 is greater than the rate R2.

Figure 17:
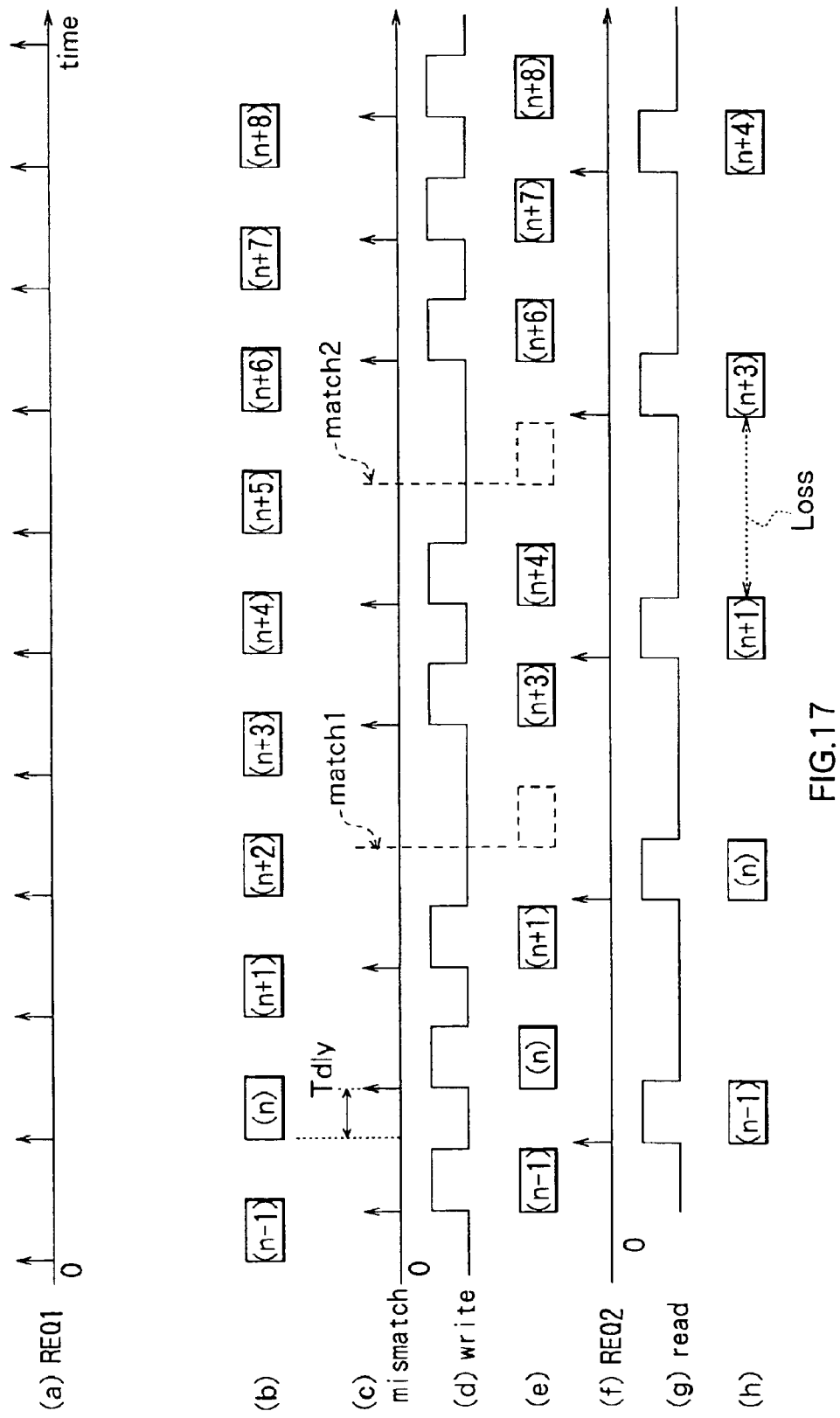
FIG. 17 is a diagram for description of operation timing of the multiplexing control circuits illustrated in FIG. 11.

Next, making reference to FIG. 17, operation timing of the multiplexing control circuits 103 and 104 at the normal time will now be described. In FIG. 17, (a) represents the request signal REQ1, (b) packets in the transport stream $TS_d$, (c) the noncoincidence signal "mismatch," (d) the write signal "write," (e) packets outputted from the delay circuit 115, (f) the request signal REQ2, (g) the read signal "read," and (h) packets in the transport stream $TS_m$.

As shown in (a), the rate control circuit 112 sends the request signal REQ1 at timing conformed to the rate R1. In response to this request signal REQ1, TS packets (n−1) to (n+8) containing the private packets 53 appear as the transport stream $TS_d$, as shown in (b). It is now assumed that TS packets (n+2) and (n+5) are assumed to be private packets. PIDs of the TS packets (n+2) and (n+5) are registered in the private packet PID table 111 beforehand.

When processing time for a packet by the PID extraction circuit 113, the PID comparison circuit 114, and the private packet PID table 111 is assumed to be Tdly, the delay time of the packet in the delay circuit 115 also becomes Tdly. Therefore, as shown in (c), therefore, the noncoincidence signal "mismatch" is established Tdly after a packet is inputted to the PID extraction circuit 113. Tdly is represented by the following expression (5).

$$Tdly=T{:}PID+T{:}PID(i)+T{:}\text{match/mismatch} \quad (5)$$

In the expression (5), T:PID is a time required for extracting the PID of the inputted packet in the PID extraction circuit. T:PID(i) is a time required for reading PIDs of the required number in those registered in the private packet PID table 111. T:match/mismatch is a time required for determining whether the PID is coincident in the PID comparison circuit 114 or not.

Upon receiving the noncoincidence signal "mismatch" from the PID comparison circuit 114, the memory control circuit 117 generates the write signal "write", as shown in (d). When the write signal "write" becomes high, the memory circuit 116 writes a packet therein. As shown in (e), the delay circuit 115 delays the packet by the time Tdly and then outputs it. In the example shown in FIG. 17, the noncoincidence signal "mismatch" is not outputted from the PID comparison circuit 114 at the time of the packet (n+2) and the packet (n+5) as represented by "match 1" and "match 2" in (c). Accordingly, the write signal "write" does not become high. As indicated with broken lines in (e), therefore, the packet (n+2) and the packet (n+5) are not written into the memory circuit 116.

On the other hand, as shown in (f), the rate control circuit of the multiplexing control circuit 104 sends out the request signal REQ2 at timing conformed to the rate R2. In response to this request signal REQ2, the memory control circuit 117 sends the read signal "read" to the memory circuit 116, as shown in (g). When this read signal "read" becomes high, the memory circuit 116 reads out a packet as shown in (h). The packet thus read out forms the transport stream $TS_m$. In the example shown in FIG. 17, the packet (n+2) has disappeared between a packet (n+1) and a packet (n+3) as represented as Loss in (h), however there are no blank time slot. In the present embodiment, the overhead of the private packet can thus be eliminated.

Figure 18:
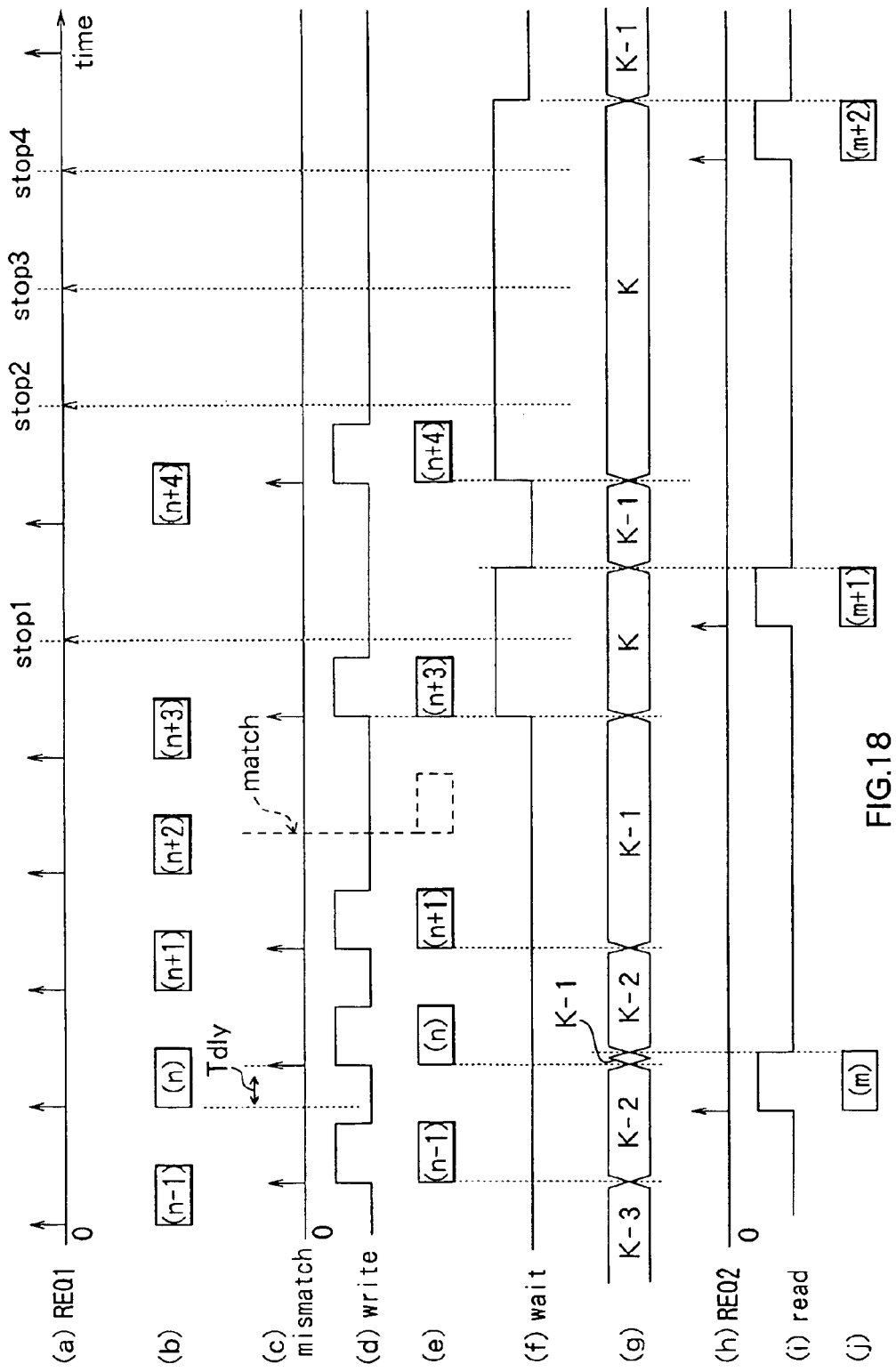
FIG. 18 is a diagram for description of operation timing of the multiplexing control circuit illustrated in FIG. 11.

Next, with reference to FIG. 18, operation timing of the multiplexing control circuits 103 and 104 including the overflow avoiding operation of the memory circuit 116 will now be described. In FIG. 18, (a) represents the request signal REQ1, (b) packets in the transport stream $TS_d$, (c) the noncoincidence signal "mismatch," (d) the write signal "write," (e) packets outputted from the delay circuit 115, (f) the wait signal "wait," (g) the number of packets monitored by the memory control circuit 117, (h) the request signal REQ2, (i) the read signal "read," and (j) packets in the transport stream $TS_m$.

In FIG. 18, write operation up to the packet (n+3) is the same as that of the example shown in FIG. 17. It is assumed in this example that the memory control circuit 117 conducts control so as to accumulate up to K packets in total in the memory circuit 116, and it is provided with a packet counter for counting packets to grasp the accumulation of packets. FIG. 18 (g) represents the count value of this packet counter.

The packet counter counts up by one at the start (rising edge) of the write signal "write" supplied from the memory control circuit 117, and counts down by one at the end (falling edge) of the read signal "read" supplied from the memory control circuit 117. It is assumed in the example shown in FIG. 18 that K−3 packets have been accumulated in the memory circuit 116 at first. As shown in (g), therefore, the value of the packet counter is K−3 at first.

When writing a packet (n−1) into the memory circuit 116 is started, the packet counter counts up by one, and the value of the packet counter becomes K−2. When writing a packet (n) into the memory circuit 116 is started, then the packet counter counts up by one, and the value of the packet counter becomes K−1. If reading a packet (m) from the memory circuit 116 is finished as shown in (6), the packet counter counts down by one, and the value of the packet counter becomes K−2. Subsequently, when writing a packet (n+1) into the memory circuit 116 is started, the packet counter counts up by one, and the value of the packet counter becomes K−1. Subsequently, since a packet (n+2) is a private packet, it is not written into the memory circuit 116. Therefore, the value of the packet counter remains K−1. Subsequently, when writing a packet (n+3) into the memory circuit 116 is started, the packet counter counts up by one, and the value of the packet counter becomes K.

When the value of the packet counter becomes K, the memory control circuit 117 sends the wait signal "wait", as shown in FIG. 18(f). Upon receiving the wait signal "wait," the rate control circuit 112 does not issue the request signal REQ1, even at timing "stop1" for issuing the request signal REQ1, as shown in (a). Subsequently, when reading a packet (m+1) from the memory circuit 116 is finished, the packet counter counts down by one, and the value of the packet counter becomes k−1. When the value of the packet counter becomes K−1 or less, the memory control circuit 117 suspends sending the wait signal "wait."

Upon suspension of the wait signal "wait" sending, the rate control circuit 112 sends out the request signal REQ1 again. Upon start of writing a packet (n+4) into the memory circuit 116 by the request signal REQ1, the packet counter counts up by one, and the value of the packet counter becomes K again. From the memory control circuit 117, the wait signal "wait" is sent out again. Thereafter, while the wait signal "wait" is being sent, the request signal REQ1 is not issued even when timing for issuing the request signal REQ1, such as "stop2", "stop3", and "stop4", is reached.

Then, if reading a packet (m+2) from the memory circuit 116 is finished, the packet counter counts down by one, and the value of the packet counter becomes K−1. The memory control circuit 117 suspends sending the wait signal "wait." If K is set to a value smaller than the number of packets causing the overflow of the memory circuit 116 according to such control, packets more than K packets are not accumulated in the memory circuit 116 owing to such control. As a result, the memory circuit 116 does not overflow.

Figure 19:
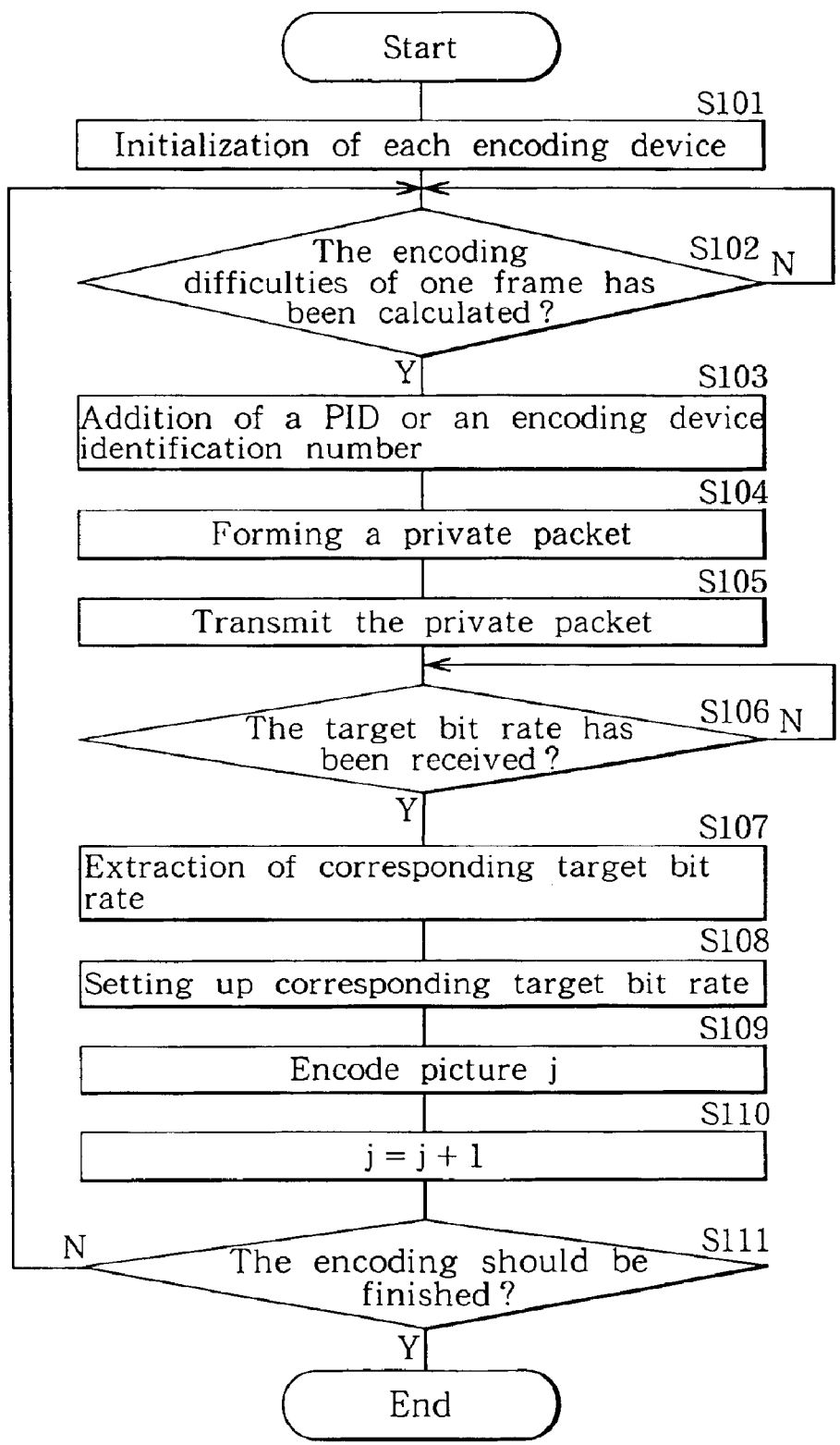
FIG. 19 is a flow chart showing operation relating to statistical multiplexing of encoding devices in an embodiment of the present invention.

Next, with reference to a flow chart of FIG. 19, operation of the encoding device $2_i$ relating to the statistical multiplexing will now be described. In this operation, first of all, each encoding device $2_i$ is initialized to a requisite state (step S101). Thereafter, on the basis of the intra AC and the ME residual, each encoding device $2_i$ derives the encoding difficulty $D_i$ concerning an image to be encoded by using the encoding difficulty calculation unit 42 of the video encoder 10. Then, each encoding device $2_i$ determines whether the encoding difficulties of one frame have been calculated (step S102) or not. Each encoding device $2_i$ waits until the calculation of the encoding difficulties corresponding to one frame is finished (step S102; N). When the calculation of the encoding difficulties corresponding to one frame has been finished (step S102; Y), each encoding device adds a PID or an encoding device identification number of each encoding device $2_i$ (step S103), forms a private packet (step S104), and transmits the private packet to the multiplexer 4 via the same transmission channel $6_i$ as that of the video packet and the audio packet (step S105).

Next, the CPU 65 of each encoding device 2i determines whether the target bit rate has been received from the statistical multiplexing computer 3 (step S106) or not. The CPU 65 waits until the target bit rate data is received (step S106; N). When the target bit rate data has been received (step S106; Y), the CPU 65 extracts the target bit rate $Rate_i$ pertinent to its own encoding device (step S107). The extracted target bit rate $Rate_i$ is set in the quantization index determining unit 45 of the video encoder 10 via the interface 72 (step S108). The quantization index determining unit 45 determines the quantization index corresponding to the quantization characteristic value in the quantization circuit 33 so as to attain the set target bit rate $Rate_i$, and sends it to the quantization circuit 33. In response to this, encoding of a picture j is conducted (step S109). By the way, the picture j means a picture to be encoded now.

Upon termination of the encoding of the picture j, j+1 is adopted as new j for the next picture processing (step S110), and it is determined whether the encoding should be finished (step S111) or not. In case that encoding should be continued (step S111; N), the processing returns to the step S102. In case that encoding should be finished (step S111; Y), the operation shown in FIG. 19 is finished.

Next, with reference to a flow chart of FIG. 20, an example of operation of the statistical multiplexing computer 3 will now be described. In this example, the statistical multiplexing computer 3 can be switched over from one of an image quality preference mode and an average bit rate preference mode to another, channel by channel. In the average bit rate preference mode, the statistical multiplexing computer 3 accepts setting of an average bit rate (Avg), a lower limit bit rate (Min), and an upper limit bit rate (Max), distributes the average bit rate thus accepted to allocate a remaining bit rate equally to channels of image quality preference. As for channels of the image quality preference mode, the statistical multiplexing computer 3 does not accept setting of an average bit rate (Avg), a lower limit bit rate (Min), and an upper limit bit rate (Max).

Figure 20:
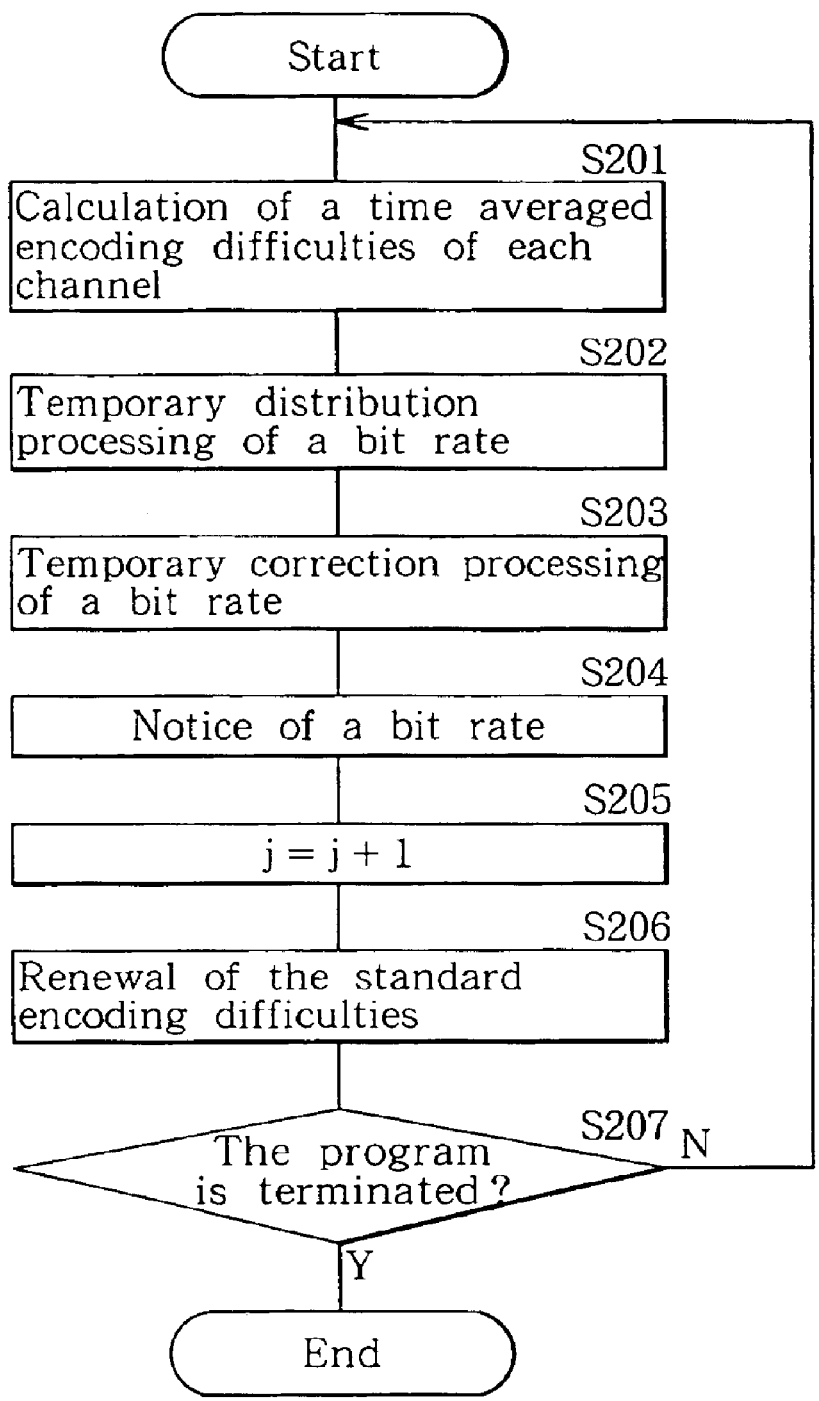
FIG. 20 is a flow chart showing an example of operation of a statistical multiplexing computer in an embodiment of the present invention.

In the operation shown in FIG. 20, the statistical multiplexing computer 3 first executes computation processing of the following expression (6) for each channel with respect to pictures of a predetermined number of frames subsequent to a picture to be encoded, and thereby calculates a time averaged encoding difficulties $AD_j$ of each channel (step S201). Unit time for deriving the time averaged value is set to 1 second. In the expression (6), $\Sigma$ means the sum total with respect to N pictures ranging from the picture to be encoded to a picture corresponding to the unit time for deriving the time averaged value. Furthermore, j represents a number of an encoding device, $D_j$ represents an encoding difficulty of each picture, and picture_rate represents a picture rate.

$$AD_j = \Sigma D_j \times picture\_rate/N \qquad (6)$$

From the time averaged encoding difficulty $AD_j$ thus calculated, the statistical multiplexing computer 3 then prescribes a rate setting function for each channel, and distributes a temporary bit rate to each channel according to the function (step S202).

Figure 21:
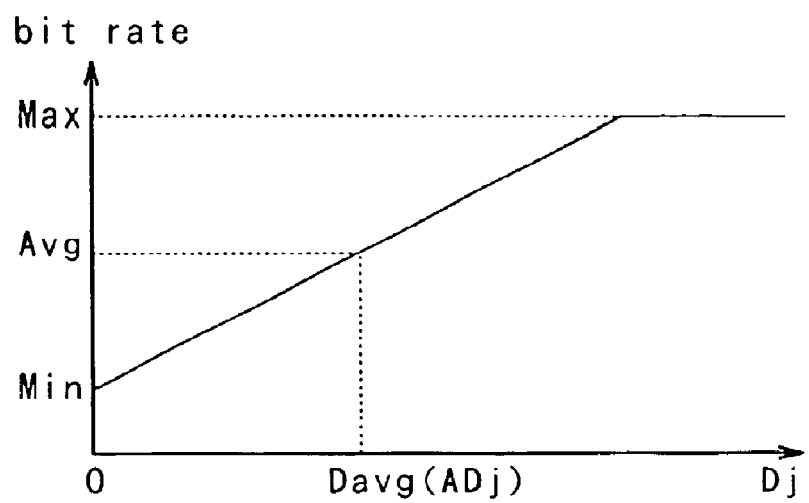
FIG. 21 is a characteristic diagram for describing the operation illustrated in FIG. 20.

For channels of the average bit rate preference mode, the statistical multiplexing computer 3 prescribes a function, as shown in FIG. 21 so that the time averaged encoding difficulty $AD_j$ of each channel may correspond to the average bit rate set for each channel and a proportional relation may be formed between the lower limit value and the upper limit value in bit rate. Furthermore, by using the encoding difficulty $D_j$ of each picture, a bit rate determined by each function thus set is detected and the bit rate thus detected is set to each of channels of the average bit rate preference.

In other words, the statistical multiplexing computer 3 calculates a temporary bit rate $Tmp\_Rate_j$ for a channel of the average bit rate preference by using the computation processing of the following expression (7). In the expression (7), the time averaged encoding difficulty $AD_j$ is represented as $D_{avg}$. Furthermore, $Rate_{ave}$, $Rate_{min}$, and $Rate_{max}$ represent an average bit rate, a lower limit bit rate, and an upper limit bit rate, respectively. Furthermore, min(A, B) is a function for selecting one having a value smaller than a value A and a value B.

$$Tmp\_Rate_j=\min(Rate_{min}+(Rate_{ave}-Rate_{min})/D_{avg} \times D_j, Rate_{max}) \quad (7)$$

Figure 22:
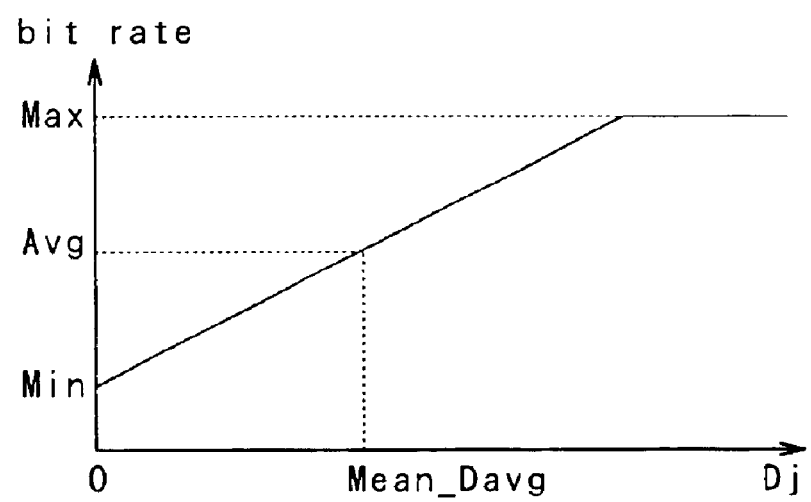
FIG. 22 is a characteristic diagram for describing the operation illustrated in FIG. 20.

On the other hand, for channels of the image quality preference, the statistical multiplexing computer 3 calculates a channel averaged encoding difficulty $\Sigma AD_j/N_q$ from the time averaged encoding difficulty $AD_j$ calculated at the step S201. Here, $N_q$ is the number of channels of the image quality preference. In addition, the statistical multiplexing computer 3 prescribes a function common to the channels of the image quality preference, as shown in FIG. 22 so that the channel averaged encoding difficulty $\Sigma AD_j/N_q$ (represented as Mean Davg in FIG. 22) may correspond to an average bit rate of channels (represented as Avg in FIG. 22) and a proportional relation may be formed between a lower limit value and an upper limit value in bit rate. Here, the average bit rate in the channels of the image quality preference is obtained by subtracting the average bit rate set in channels of the average bit rate preference from the total bit rate, and distributes a resultant remained bit rate equally to the channels of the image quality preference. Furthermore, the minimum value and the maximum value are preset values.

Next, the statistical multiplexing computer 3 detects a bit rate determined by the function set as described above according to the encoding difficulty $D_j$ of each picture, for each of the channels of image quality preference, and sets the bit rate to each of the channels of image quality preference.

Upon thus setting temporary bit rates, the statistical multiplexing computer 3 executes temporary bit rate correction processing (step S203). By this correction processing, the statistical multiplexing computer 3 sets the total bit rate so that the total bit rate may become the bit rate assigned to the statistical multiplexing system 1.

Figure 23:
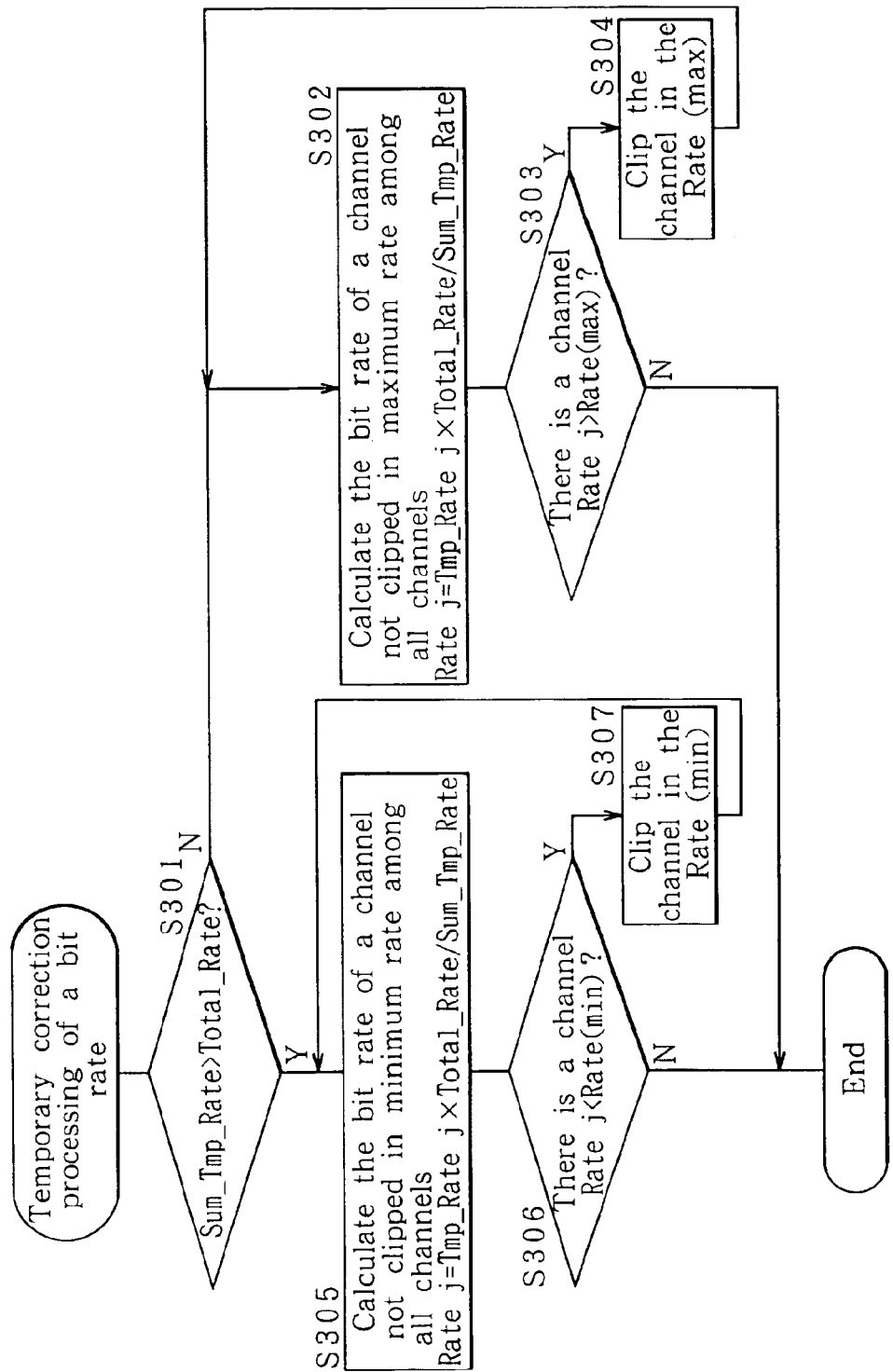
FIG. 23 is a flow chart showing provisional bit rate correction processing illustrated in FIG. 20.

FIG. 23 shows temporary bit rate correction processing. By determining whether a relation of the following expression (8) holds true in this processing, the statistical multiplexing computer 3 determines whether a sum total bit rate Sum_Tmp_Rate obtained from the temporary bit rate $Tmp\_Rate_j$ of each channel detected at the step S202 exceeds the bit rate (Total_Rate) assigned to the statistical multiplexing system 1 (step S301).

$$Sum\_Tmp\_Rate > Total\_Rate \quad (8)$$

When a negative result is obtained (N), there is still a margin. If transmission is conducted at this temporary bit rate, null bits having no meaning are transmitted. Therefore, the statistical multiplexing computer 3 proceeds to step S302. Here, the statistical multiplexing computer 3 detects such channels that the bit rate is not limited by the upper limit value Max of the bit rate. Furthermore, by using computation processing of the following expression (9), the statistical multiplexing computer 3 proportionally allocate the margin bit rate to the detected channels, and derives a bit rate $Rate_j$ (step S302).

$$Rate_j = Tmp\_Rate_j \times (Total\_Rate/Sum\_Tmp\_Rate) \quad (9)$$

In the expression (9), Total_Rate is a remaining bit rate obtained by subtracting the bit rate of the channels limited in bit rate by the upper limit bit rate value Max from the bit rate Total_Rate assigned to the statistical multiplexing system 1. Sum_Tmp Rate is the sum total of the temporary rates $Tmp\_Rate_j$ temporarily set for channels which are not limited in bit rate by the upper limit bit rate value Max.

Bit rates are thus set. By determining whether the following expression (10) holds true in each channel, the statistical multiplexing computer 3 determines whether there is a channel having a bit rate exceeding the upper limit bit rate value Max (Rate(Max)) in the channels having bit rates thus set (step S303).

$$Rate_j > Rate(Max) \quad (10)$$

If a bit rate exceeding the upper limit bit rate value Max (Rate(Max)) exists (Y), the statistical multiplexing computer 3 sets (clips) the bit rate $Rate_j$ of the channel having a bit rate exceeding the upper limit bit rate value Max (Rate(Max)) to the upper limit value (step S304), and thereafter returns to the step S302.

As a result, the statistical multiplexing computer 3 repeats the processing procedure of steps S302-S303-S304-S302 as occasion demands. In such a range as not to exceed the upper limit value in each channel, the statistical multiplexing computer 3 thus conducts allocation of a remaining bit rate after temporary setting, and sets the bit rate of each channel. Further, upon completion of this setting, a negative result (N) is obtained at the step S303, and the temporary bit rate correction processing is finished.

On the other hand, when the sum total bit rate Sum_Tmp Rate obtained from the temporary bit rate $Tmp\_Rate_j$ of each channel detected at the step S202 exceeds the bit rate (Total_Rate) assigned to the statistical multiplexing system 1 (step S301; Y), the statistical multiplexing computer 3 proceeds to step S305.

Here, the statistical multiplexing computer 3 detects such channels that the bit rate is not limited by the lower limit value Min of the bit rate. Furthermore, by using computation processing of the following expression (11), the statistical multiplexing computer 3 proportionally allocate the extra bit rate exceeding the bit rate Total_Rate assigned to the statistical multiplexing system 1 to the detected channels, and derives a bit rate $Rate_j$ (step S305).

$$Rate_j = Tmp\_Rate_j \times (Total\_Rate/Sum\_Tmp\_Rate) \quad (11)$$

In the expression (11), Total_Rate is a remaining bit rate obtained by subtracting the bit rate of the channels limited in bit rate by the lower limit bit rate value Min from the bit rate Total_Rate assigned to the statistical multiplexing system 1. Sum_Tmp_Rate is the sum total of the temporary rates $Tmp\_Rate_j$ temporarily set for channels which are not limited in bit rate by the lower limit bit rate value Min.

Bit rates are thus set. By determining whether the following expression (12) holds true in each channel, the statistical multiplexing computer 3 determines whether there is a channel having a bit rate less than the lower limit bit rate value Min (Rate (Min)) in the channels having bit rates thus set (step S306).

$$Rate_j < Rate(Min) \tag{12}$$

When a bit rate less than the lower limit bit rate value Min (Rate(Min)) exists (Y), the statistical multiplexing computer 3 sets (clips) the bit rate $Rate_j$ of the channel having a bit rate less than the lower limit bit rate value Min (Rate(Min)) to the lower limit value (step S307), and then returns to the step S305.

As a result, the statistical multiplexing computer 3 repeats the processing procedure of steps S305-S306-S307-S305 as occasion demands. In such a range as not to be less the lower limit value in each channel, the statistical multiplexing computer 3 thus conducts allocation of the bit rate shortage after temporary setting, and sets the bit rate of each channel. Further, upon completion of this setting, a negative result (N) is obtained at the step S306, and the temporary bit rate correction processing is finished.

Upon thus correcting the temporary bit rates and setting the bit rate of each channel, the statistical multiplexing computer 3 proceeds to step S204 (FIG. 20) and notifies each encoding device $2_i$ of the bit rate thus calculated. Subsequently, by incrementing the variable j, the statistical multiplexing computer 3 sets the picture to be thus calculated in bit rate to the next picture (step S205).

Subsequently, by updating the time averaged encoding difficulty $D_{avg}$ and the channel averaged encoding difficulty Mean_$D^{avg}$, the statistical multiplexing computer 3 updates the reference value prescribing the functions which have been used to calculate the temporary bit rates (step S206).
w As for the channels of the average bit rate preference, the statistical multiplexing computer 3 then determines whether the picture is the last picture of the GOP. In the case of the last picture, the statistical multiplexing computer 3 executes computation processing of the following expression (13) and thereby updates the time averaged encoding difficulty value $D_{avg}$.

$$D_{avg} = \{(k-1) \times D_{avg} + Ad_j\}k \tag{13}$$

Figure 24:
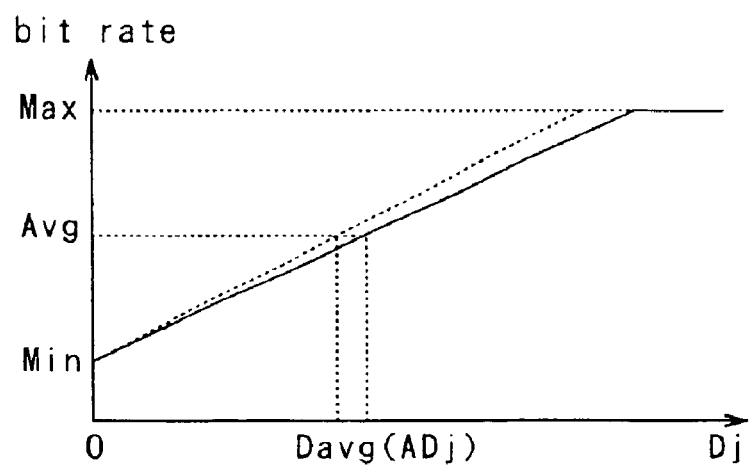
FIG. 24 is a characteristic diagram for describing the operation illustrated in FIG. 20.

The encoding difficulty $D_{avg}$ on the right side is the encoding difficulty of the calculation reference of one GOP before. Furthermore, k is a weighting coefficient, and a sufficiently large integer is used as k. As a result, the statistical multiplexing computer 3 changes the encoding difficulty $D_{avg}$ of this calculation reference by using a predetermined time constant according to a change of the encoding difficulty $D_j$. For example, the statistical multiplexing computer 3 changes the time averaged function used until then as represented by a broken line in FIG. 24 to a time averaged function as represented by a solid line.

On the other hand, as for channels of the image quality preference, the statistical multiplexing computer 3 sets any one of channels as a channel of update reference, and determines whether the picture is the last picture of the GOP in the channel of update reference. In the case of the last picture, the statistical multiplexing computer 3 executes computation processing of the following expression (14) and thereby updates the channel averaged encoding difficulty Mean_$D_{avg}$.

$$Mean\_D_{avg} = \{(k-1) \times Mean\_D_{avg} + \Sigma Ad_j + \Sigma Ad_j N_q\}/k \tag{14}$$

Figure 25:
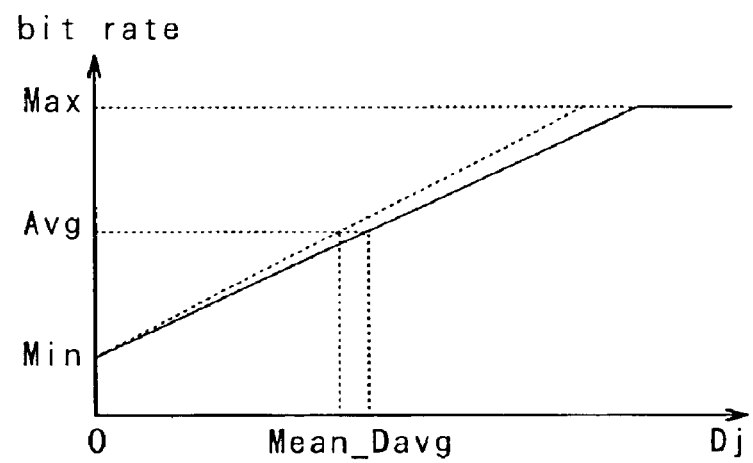
FIG. 25 is a characteristic diagram for describing the operation illustrated in FIG. 20.

Nq is the number of channels of the image quality preference. The encoding difficulty value Mean_Davg on the right side is the encoding difficulty of the calculation reference of one GOP before. As a result, the statistical multiplexing computer 3 derives the channel average $\Sigma AD_j/N_q$ of the encoding difficulty $D_j$ of channels of the image quality preference, conducts weighted averaging thereof, and thereby updates the encoding difficulty Mean_$D_{avg}$ of the calculation reference. For example, the statistical multiplexing computer 3 changes the channel averaged function used until then as represented by a broken line in FIG. 25 to a channel averaged function as represented by a solid line.

Upon thus updating the encoding difficulty values $D_{avg}$ and Mean_$D_{avg}$, the statistical multiplexing computer 3 determines whether the program is terminated (step S207). When a negative result (N) is obtained, the control returns to step S201. While updating the time averaged function and channel averaged function by taking a GOP as the unit, the statistical multiplexing computer 3 thus calculates the bit rates sequentially by taking a picture as the unit, and notifies each encoding device $2_i$ of the calculated bit rate. Further, upon completion of a series of processing, an affirmative result (Y) is obtained at the step S207, and the statistical multiplexing computer 3 finishes the control operation using the statistical multiplexing.

As for channels of the average bit rate preference, the statistical multiplexing computer 3 sets the target bit rate so that the bit rate may change according to the encoding difficulty, before and after the average bit rate set for each channel. As for channels of the image quality preference, the statistical multiplexing computer 3 sets the target bit rate so that the total bit rate may change according to the total encoding difficulty, before and after the remaining bit rate obtained by subtracting the average bit rate of the channels of the average bit rate preference from the total bit rate.

As described above, according to the present embodiment, the encoding difficulties $D_i$ generated by the respective encoding devices $2_i$ are transmitted to the multiplexer 4 via the same transmission channels $6_i$ as the video data and the audio data by utilizing the private packet of the transport stream in the MPEG system, and multiplexed by the multiplexer 4. Multiplexed transport stream $TS_d$ is thus generated and transmitted to the statistical multiplexing computer 3. The statistical multiplexing computer 3 extracts the encoding difficulties $D_i$ of the respective encoding devices 2; from the transport stream $TS_d$ supplied from the multiplexer 4. On the basis of the encoding difficulties $D_i$, the statistical multiplexing computer 3 calculates the target bit rate $Rate_i$ of the respective encoding devices $2_i$. As a result, it becomes possible to transmit a large number of encoding difficulties to the statistical multiplexing computer 3.

Also, according to the present embodiment, the multiplexer 4 conducts multiplexing processing on data supplied from the encoding devices $2_i$ at the first rate R1 larger than the data transmission rate on the transmission channel of the subsequent stage, and outputs the transport stream $TS_d$ including the private packets for statistical multiplexing to the statistical multiplexing computer 3. In addition, the multiplexer 4 conducts multiplexing processing on data obtained by removing the data for statistical multiplexing from the data outputted from the respective encoding devices $2_i$, at a second rate R2 which is equal to the transmission rate on the transmission channel of the subsequent stage, and outputs the transport stream $TS_m$ which does not include the private packets for statistical multiplexing to the transmission channel of the subsequent stage. As a result, the data sent to the transmission channel of the subsequent stage is not affected by the rate occupied by the private packet for conducting control using the statistical multiplexing. It thus becomes possible to prevent the data transmission efficiency from being lowered.

Furthermore, in the present embodiment, the memory control circuit 117 in the multiplexing control circuit 103 controls the rate control circuit 112 so as to prevent the overflow of the memory circuit 116. No matter how the rate R1 may be greater than the rate R2, therefore, the memory circuit 116 does not overflow, but the normal operation becomes possible.

The present invention is not limited to the above described embodiment. For example, in the embodiment, the statistical multiplexing computer 3 takes out the private packet from the transport stream $TS_d$. Alternatively, the multiplexer 4 may take out only the private packets from the transport stream $TS_d$, and output the private packets to the statistical multiplexing computer 3.

Furthermore, according to the present invention, not only the low rate data such as the private packet used for statistical multiplexing, but also a higher rate data can be sent from the encoding device 2, to the multiplexer 4. The data can be sent from the multiplexer 4 and used for various kinds of control.

As described above, according to the video data multiplexing device or the video data multiplexing control method of the present invention, statistical multiplexing data is generated and outputted on the same transmission channel as the encoded stream are transmitted, by the encoding means. The encoded stream and the statistical multiplexing data are acquired from each encoding means, and multiplexed and outputted by the multiplexing means. The statistical multiplexing data of each encoding means is acquired from output of the multiplexing means, and control using statistical multiplexing is conducted on each encoding means on the basis of the statistical multiplexing data, by the encoding control means. This results in an effect that the statistical multiplexing data required for control using the statistical multiplexing can be efficiently transmitted.

According to the video data multiplexing device or the video data multiplexing control method of the present invention, the multiplexing means removes the statistical multiplexing data out of data obtained by multiplexing the encoded stream and the statistical multiplexing data supplied from the respective encoding means, and outputs resultant data to a transmission channel of a subsequent stage. This results in an effect that data transmission can be conducted without uselessness with respect to original multiplexed data to be outputted to the subsequent stage.

Furthermore, according to the video data multiplexing device or the video data multiplexing control method of the present invention, the packet of the statistical multiplexing data includes identification data and data for rejection detection. This result in an effect that it becomes possible to detect whether there has been rejection of a packet for statistical multiplexing data and prevent a system failure due to rejection of a packet for statistical multiplexing data.

Furthermore, according to the video data multiplexing device or the video data multiplexing control method of the present invention, each encoding means generates statistical multiplexing data required for control using statistical multiplexing, and outputs the generated data on the same transmission channel as the encoded stream are transmitted. Furthermore, the multiplexing means acquires the encoded stream and the statistical multiplexing data from the respective encoding means via the transmission channels, conducts multiplexing processing on the encoded streams and the statistical multiplexing data at a first rate greater than a data transmission rate on a transmission channel of a subsequent stage, and outputs first data including the statistical multiplexing data. In addition, the multiplexing means conducts multiplexing processing on data obtained by removing the statistical multiplexing data from the data outputted from the respective C; encoding means, at a second rate equal to a data transmission rate on the transmission channel of the subsequent stage, and outputs second data which does not include the statistical multiplexing data to the transmission channel of the subsequent stage. An encoding control means acquires the statistical multiplexing data of each encoding means from the first data outputted from the multiplexing means, and conducts control using statistical multiplexing on each encoding means on the basis of the statistical multiplexing data. This results in an effect that the statistical multiplexing data required for the control by the statistical multiplexing can be transmitted efficiently, and the second data sent to the transmission channel of the subsequent stage is not affected by the statistical multiplexing data, thus the data transmission efficiency being prevented from being lowered.

Furthermore, according to the encoded stream multiplexing device or the encoded stream multiplexing method according to the present invention, a plurality of transport streams including the video transport stream packets and private transport stream packets, which include the encoding difficulty information indicating the encoding difficulty at the time of encoding video data of a plurality of channels, are multiplexed. A multiplexed transport stream is thus generated. A private transport stream packet included in the multiplexed transport stream is extracted. On the basis of the encoding difficulty information described in the extracted private transport stream packets, the target encoding rates respectively corresponding to the plurality of channels are computed. This results in an effect that the encoding difficulty information can be transmitted efficiently.

Furthermore, according to the encoding device or the encoding method according to the present invention, a plurality of encoded video streams generated by encoding the video data of the plurality of channels are outputted as video transport stream packets. In addition, encoding difficulty information indicating encoding difficulty in encoding video data of the plurality of channels is outputted as private transport stream packets. On the basis of the encoding difficulty information described in the outputted private transport stream packets, the target encoding rates respectively corresponding to the plurality of channels are computed, and thereby rates of the encoded streams are controlled. This results in an effect that the encoding difficulty information can be transmitted efficiently.

From the description heretofore made, it is apparent that various aspects and modifications of the present invention can be implemented. In the scope of the following claims, therefore, the present invention can be implemented in aspects other than the aspect heretofore described in detail.

What is claimed is:

1. A video data multiplexing device comprising:

a plurality of encoding means for encoding program data respectively including video data, outputting resultant encoded streams, generating statistical multiplexing data required for control using statistical multiplexing, and outputting the generated data on the same transmission channels as the encoded streams;

multiplexing means for acquiring the encoded streams and the statistical multiplexing data from the respective encoding means via the transmission channels, conducting multiplexing processing on the encoded streams and the statistical multiplexing data at a first rate greater than a data transmission rate on a transmission channel of a subsequent stage, outputting first data including the statistical multiplexing data, conducting multiplexing processing on data obtained by removing the statistical multiplexing data from the data outputted from the respective encoding means, at a second rate equal to a data transmission rate on the transmission channel of the subsequent stage, and outputting second data which does not include the statistical multiplexing data to the transmission channel of the subsequent stage; and encoding control means for acquiring the statistical multiplexing data of the respective encoding means from the first data outputted from the multiplexing means, and conducting control using statistical multiplexing on the respective encoding means on the basis of the statistical multiplexing data.

2. A video data multiplexing device according to claim 1, wherein the encoding means forms the encoded streams and the statistical multiplexing data respectively as packets and outputs the packets.

3. A video data multiplexing device according to claim 1, wherein the multiplexing means includes a multiplexing unit for acquiring the encoded streams and the statistical multiplexing data from the respective encoding means via the transmission channels, and multiplexing them, a first multiplexing control unit for controlling the multiplexing unit so that the first data may be outputted from the multiplexing unit at the first rate, and holding data obtained by removing the statistical multiplexing data from the first data outputted from the multiplexing unit, and a second multiplexing control unit for controlling the first multiplexing control unit so that the data held by the first multiplexing control unit may be outputted to the transmission channel of the subsequent stage at the second rate as the second data.

4. A video data multiplexing control method used in a video data multiplexing device including a plurality of encoding means for encoding program data respectively including video data and outputting encoded streams, multiplexing means for multiplexing the encoded streams outputted from controlling each of the encoding means, and encoding control means for controlling each of the encoding means, wherein control using statistical multiplexing is conducted on each of the encoding means by the encoding control means, comprising:

a statistical multiplexing data output procedure in the encoding means for generating statistical multiplexing data required for control using statistical multiplexing, and outputting the generated data on the same transmission channel as the encoded streams are transmitted;

a multiplexing procedure in the multiplexing means for acquiring the encoded streams and the statistical multiplexing data from the respective encoding means via the transmission channels, conducting multiplexing processing on the encoded streams and the statistical multiplexing data at a first rate greater than a data transmission rate on a transmission channel of a subsequent stage, outputting first data including the statistical multiplexing data, conducting multiplexing processing on data obtained by removing the statistical multiplexing data from the data outputted from the respective encoding means, at a second rate equal to a data transmission rate on the transmission channel of the subsequent stage, and outputting second data which does not include the statistical multiplexing data to the transmission channel of the subsequent stage; and an encoding control procedure in the encoding control means for acquiring the statistical multiplexing data of the respective encoding means from the first data outputted from the multiplexing means, and conducting control using statistical multiplexing on the respective encoding means on the basis of the statistical multiplexing data.

5. A video data multiplexing control method according to claim 4, wherein in the statistical multiplexing data output procedure, the statistical multiplexing data is formed as packets and outputted.

* * * * *